United States Patent
Jain et al.

(10) Patent No.: US 10,091,609 B2
(45) Date of Patent: Oct. 2, 2018

(54) ENHANCING PRS SEARCHES VIA RUNTIME CONDITIONS

(71) Applicant: QUALCOMM Incorporated, San Diego, CA (US)

(72) Inventors: Amit Jain, San Diego, CA (US); Dinesh Subramani, San Diego, CA (US); Gautam Nirula, San Diego, CA (US)

(*) Notice: Subject to any disclaimer, the term of this patent is extended or adjusted under 35 U.S.C. 154(b) by 0 days.

(21) Appl. No.: 15/082,405

(22) Filed: Mar. 28, 2016

(65) Prior Publication Data

US 2017/0280280 A1 Sep. 28, 2017

(51) Int. Cl.
| | |
|---|---|
| *H04M 3/00* | (2006.01) |
| *H04W 4/02* | (2018.01) |
| *H04W 4/90* | (2018.01) |
| *H04L 5/00* | (2006.01) |
| *H04W 24/08* | (2009.01) |
| *H04W 72/10* | (2009.01) |
| *G01S 5/02* | (2010.01) |
| *H04W 64/00* | (2009.01) |

(52) U.S. Cl.
CPC ............ *H04W 4/02* (2013.01); *G01S 5/0236* (2013.01); *H04L 5/0048* (2013.01); *H04W 4/90* (2018.02); *H04W 24/08* (2013.01); *H04W 64/00* (2013.01); *H04W 72/10* (2013.01)

(58) Field of Classification Search
CPC ....... H04W 48/18; H04W 4/22; H04W 80/04; H04W 4/02; H04W 5/0048; H04W 88/02; H04M 1/72519; H04M 1/72522; H04L 5/0053

USPC ......... 455/435.3, 404.2, 550.1, 418; 370/328
See application file for complete search history.

(56) References Cited

U.S. PATENT DOCUMENTS

| | | | |
|---|---|---|---|
| 8,099,106 B2* | 1/2012 | Soliman ................ | G01S 5/0252 342/114 |
| 2008/0267504 A1* | 10/2008 | Schloter ............ | G06F 17/30879 382/181 |
| 2011/0105144 A1 | 5/2011 | Siomina et al. | |
| 2011/0201332 A1 | 8/2011 | Siomina et al. | |
| 2011/0275385 A1 | 11/2011 | Escolar-Piedras et al. | |
| 2013/0223235 A1* | 8/2013 | Hu ........................ | H04W 36/04 370/242 |
| 2015/0117354 A1* | 4/2015 | Dai ....................... | H04L 5/0053 370/329 |

(Continued)

FOREIGN PATENT DOCUMENTS

| | | | | |
|---|---|---|---|---|
| EP | 2876951 A1 | 5/2015 | | |
| WO | WO 2011/097760 | * 8/2011 | ............ | H04W 64/00 |

(Continued)

OTHER PUBLICATIONS

International Search Report and Written Opinion—PCT/US2017/019220—ISA/EPO—dated Aug. 28, 2017.

*Primary Examiner* — Danh Le
(74) *Attorney, Agent, or Firm* — Berkeley Law & Technology Group, LLP

(57) ABSTRACT

Example methods, apparatuses, and/or articles of manufacture are disclosed herein that may be utilized, in whole or in part, to facilitate and/or support one or more operations and/or techniques for enhancing searches for positioning reference signals (PRS) via one or more runtime conditions, such as for use in or with mobile communication devices, for example.

28 Claims, 6 Drawing Sheets

(56) References Cited

U.S. PATENT DOCUMENTS

| | | | |
|---|---|---|---|
| 2015/0296339 A1 | 10/2015 | Woo et al. | |
| 2016/0088579 A1* | 3/2016 | Harada | H04W 48/10 370/336 |
| 2016/0134402 A1* | 5/2016 | Park | H04L 27/2607 370/329 |
| 2016/0248563 A1* | 8/2016 | Behravan | H04L 5/0087 |
| 2017/0013551 A1* | 1/2017 | Martin | H04W 48/18 |
| 2017/0086206 A1* | 3/2017 | Wang | H04W 72/085 |
| 2017/0202025 A1* | 7/2017 | Ouchi | H04W 74/0833 |

FOREIGN PATENT DOCUMENTS

| | | |
|---|---|---|
| WO | WO-2011097760 A1 | 8/2011 |
| WO | WO-2011139201 A1 | 11/2011 |

\* cited by examiner

ENHANCING PRS SEARCHES VIA RUNTIME CONDITIONS

BACKGROUND

1. Field

The present disclosure relates generally to position or location estimations of mobile communication devices and, more particularly, to enhancing searches for positioning reference signals (PRS) via one or more runtime conditions for use in or with mobile communication devices.

2. Information

Mobile communication devices, such as, for example, cellular telephones, portable navigation units, laptop computers, personal digital assistants, or the like are becoming more common every day. Certain mobile communication devices, such as, for example, location-aware cellular telephones, smart telephones, or the like may assist users in estimating their geographic locations by providing positioning assistance parameters obtained or gathered from various systems. For example, in an outdoor environment, certain mobile communication devices may obtain an estimate of their geographic location or so-called "position fix" by acquiring wireless signals from a satellite positioning system (SPS), such as the global positioning system (GPS) or other like Global Navigation Satellite Systems (GNSS), cellular base station, etc. via a cellular telephone or other wireless or electronic communications network. Acquired wireless signals may, for example, be processed by or at a mobile communication device, and its location may be estimated using known techniques, such as Advanced Forward Link Trilateration (AFLT), base station identification, cell tower triangulation, or the like.

In an indoor or like environment, such as urban canyons, for example, mobile communication devices may be unable to reliably receive or acquire satellite or like wireless signals to facilitate and/or support one or more position estimation techniques. For example, signals from an SPS or other wireless transmitters may be attenuated or otherwise affected in some manner (e.g., insufficient, weak, fragmentary, etc.), which may at least partially preclude their use for position estimations. At times, a mobile communication device may obtain a position fix by measuring ranges to three or more terrestrial wireless transmitter devices, such as cellular base stations, access points, etc. positioned at known locations. Ranges may be measured, for example, by obtaining a Media Access Control identifier (MAC ID) address from wireless signals received from suitable access points and measuring one or more characteristics of received signals, such as signal strength, round trip delay, or the like.

In some instances, a position fix of a mobile communication device may be obtained in connection with an observed time difference of arrival (OTDOA) technique. In this technique, a mobile communication device may measure timing differences between reference signals received from two or more pairs of cellular base stations, for example, and may obtain a position fix based, at least in part, on known locations and transmission timing for the measured base stations. An OTDOA positioning technique may, for example, also be employed to assist in localization of a mobile communication device in the event of an emergency call, such as in compliance with Emergency 911 (E911) mandates from the Federal Communication Commission (FCC). At times, however, OTDOA positioning accuracy may be affected, at least in part, by a search capacity of a mobile communication device for measuring candidate cellular base stations, such as in connection with parameters specified by a location server, for example. In some instances, OTDOA positioning accuracy may also be affected, at least in part, by receiver sensitivity or hearability issues, such as if wireless signals of OTDOA requests acquired from cellular base stations have low or insufficient power (e.g., interfered, etc.), such as to facilitate and/or support appropriate measurements (e.g., reference signal time differences, etc.), for example.

BRIEF DESCRIPTION OF THE DRAWINGS

Non-limiting and non-exhaustive aspects are described with reference to the following figures, wherein like reference numerals refer to like parts throughout the various figures unless otherwise specified.

SUMMARY

Figure 1:
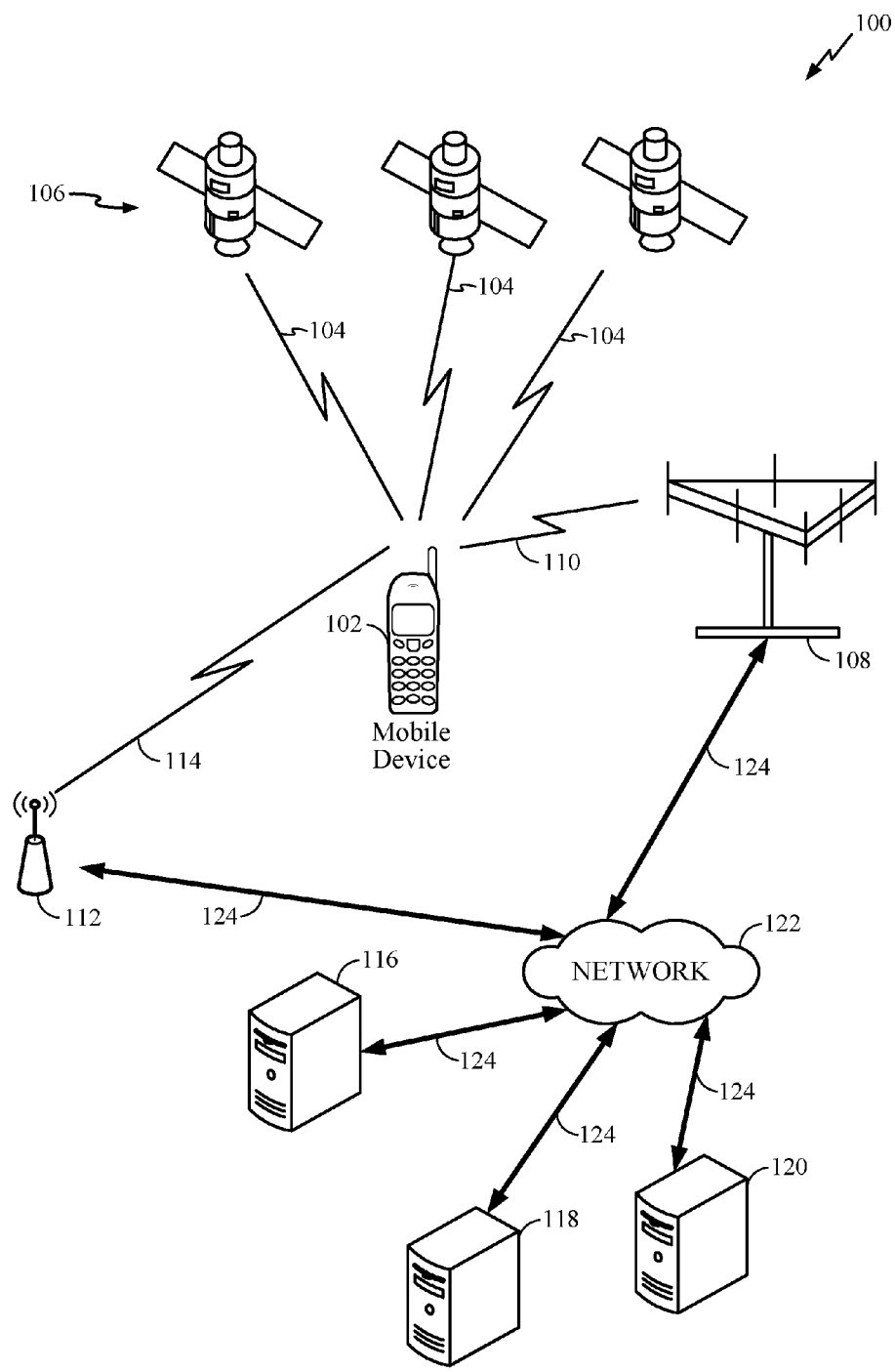
FIG. 1 is a schematic diagram illustrating features associated with an implementation of an example operating environment.

Example implementations relate to techniques for enhancing PRS searches via one or more runtime conditions. In one implementation, a method may comprise obtaining, at a mobile device, positioning assistance data, such as transmitted by a location server, for example, the positioning assistance data identifying a plurality of wireless transmitters; prioritizing a search for acquisition of positioning reference signals (PRS) transmitted from the plurality of wireless transmitters based, at least in part, on measured power levels of cell-specific reference signals (CRS) transmitted from one or more of the plurality of wireless transmitters, the search being prioritized via searching for the PRS from the plurality of wireless transmitters associated with higher measured power levels of the CRS than ones associated with lower measured power levels of the CRS.

In another implementation, an apparatus may comprise means for obtaining positioning assistance data, such as transmitted by a location server, for example, the positioning assistance data identifying a plurality of wireless transmitters; means for prioritizing a search for acquisition of positioning reference signals (PRS) transmitted from the plurality of wireless transmitters based, at least in part, on measured power levels of cell-specific reference signals (CRS) transmitted from one or more of the plurality of wireless transmitters, the means for prioritizing the search further comprising means for prioritizing the search via searching for the PRS from the plurality of wireless transmitters associated with higher measured power levels of the CRS than ones associated with lower measured power levels of the CRS.

In yet another implementation, an apparatus may comprise a communication interface to communicate with an electronic communications network, the communication interface configured to obtain positioning assistance data, such as transmitted by a location server, for example, the positioning assistance data identifying a plurality of wireless transmitters; and one or more processors coupled to a memory and to the communication interface, the one or more processors configured to prioritize a search for acquisition of positioning reference signals (PRS) transmitted from the plurality of wireless transmitters based, at least in part, on measured power levels of cell-specific reference signals (CRS) transmitted from one or more of the plurality of wireless transmitters, the search being prioritized via searching for the PRS from the plurality of wireless transmitters associated with higher measured power levels of the CRS than ones associated with lower measured power levels of the CRS.

In yet another implementation, an article may comprise a non-transitory storage medium having instructions executable by a processor to obtain, at a mobile device, positioning assistance data, such as transmitted by a location server, for example, the positioning assistance data identifying a plurality of wireless transmitters; prioritize a search for acquisition of positioning reference signals (PRS) transmitted from the plurality of wireless transmitters based, at least in part, on measured power levels of cell-specific reference signals (CRS) transmitted from one or more of the plurality of wireless transmitters, the search being prioritized via searching for the PRS from the plurality of wireless transmitters associated with higher measured power levels of the CRS than ones associated with lower measured power levels of the CRS.

In yet another one implementation, a method may comprise obtaining, at a mobile device, positioning assistance data, such as transmitted by a location server, for example, the positioning assistance data identifying a plurality of wireless transmitters; and prioritizing, in response to an emergency event, a search for acquisition of PRS transmitted from the plurality of wireless transmitters via extending a duration to search at least one of the PRS based, at least in part, on the emergency event.

In yet another implementation, an apparatus may comprise means for obtaining positioning assistance data, such as transmitted by a location server, for example, the positioning assistance data identifying a plurality of wireless transmitters; and means for prioritizing, in response to an emergency event, a search for acquisition of PRS transmitted from the plurality of wireless transmitters via extending a duration to search at least one of the PRS based, at least in part, on the emergency event.

In yet another implementation, an apparatus may comprise a communication interface to communicate with an electronic communications network, the communication interface configured to obtain positioning assistance data, such as transmitted by a location server, for example, the positioning assistance data identifying a plurality of wireless transmitters; and one or more processors coupled to a memory and to the communication interface, the one or more processors configured to prioritize, in response to an emergency event, a search for acquisition of PRS transmitted from the plurality of wireless transmitters via extending a duration to search at least one of the PRS based, at least in part, on the emergency event.

In yet another implementation, an article may comprise a non-transitory storage medium having instructions executable by a processor to obtain, at a mobile device, positioning assistance data, such as transmitted by a location server, for example, the positioning assistance data identifying a plurality of wireless transmitters; and prioritize, in response to an emergency event, a search for acquisition of PRS transmitted from the plurality of wireless transmitters via extending a duration to search at least one of the PRS based, at least in part, on the emergency event. It should be understood, however, that these are merely example implementations, and that claimed subject matter is not limited to these particular implementations.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, or articles of manufacture are disclosed herein that may be implemented, in whole or in part, to facilitate and/or support one or more operations and/or techniques for enhancing PRS searches via one or more runtime conditions for use in or with mobile communication devices. In this context, "runtime conditions" refer to one or more constraints, such as for measuring one or more aspects or characteristics of wireless signals and/or for responding with or transmitting one or more measured aspects or characteristics. Particular examples of runtime conditions will be described in greater detail below. It should be noted that even though the discussion throughout the specification primarily references particular signals, protocols, and/or networks, such as, for example, PRS for OTDOA in 4G Long Term Evolution (LTE), such as for ease of description, any other suitable sign signals, protocols, and/or networks, such as 1× signals for Advanced Forward Link Trilateration (AFLT) in Code Division Multiple Access (CDMA), enhanced Cell ID (E-CID), and/or Wi-Fi positioning (e.g., based on downlink signals according to IEEE 802.11x standards, etc.), positioning for short range nodes (SRNs), such as Bluetooth® Low Energy (BTLE) beacons, satellite positioning system (SPS) signals, or the like may also be utilized herein, in whole or in part, such as in a similar or like fashion and/or without deviating from the scope of claimed subject matter.

As used herein, "mobile device," "mobile communication device," "location-aware mobile device," or like terms may be used interchangeably and may refer to any kind of special purpose computing platform or apparatus that may from time to time have a position or location that changes. In some instances, a mobile communication device may, for example, be capable of communicating with other devices, mobile or otherwise, through wireless transmission or receipt of information according to one or more communication protocols. As a way of illustration, special purpose mobile communication devices, which may herein be called simply mobile devices, may include, for example, cellular telephones, smart telephones, personal digital assistants (PDAs), laptop computers, personal entertainment systems, tablet personal computers (PC), personal audio or video devices, personal navigation devices, radio heat map generation tools, or the like. It should be appreciated, however, that these are merely examples of mobile devices that may be used, at least in part, to implement one or more operations and/or techniques for enhancing PRS searches via one or more runtime conditions, and that claimed subject matter is not limited in this regard. It should also be noted that the terms "position" and "location" may be used interchangeably herein.

As alluded to previously, at times, a position fix of a mobile device, such as a cellular telephone, for example, may be obtained based, at least in part, on information gathered from various systems. One such system may comprise, for example, an OTDOA positioning system. In this system, a server may facilitate and/or support positioning of a mobile device by providing positioning assistance data as well as computing and/or verifying (e.g., if computed at a mobile device, etc.) a position fix using one or more specific signals, referred to as reference signals. Namely, a mobile device may, for example, measure a time difference between reference signals received from a reference wireless transmitter and one or more neighbor wireless transmitters positioned at known locations. In this context, a "wireless transmitter" refers to any suitable device capable of transmitting and/or receiving wireless signals, such as via an integrated or associated receiver and/or transmitter, for example. As a way of illustration, a wireless transmitter may comprise, for example, a cellular base station, wireless local area network (WLAN) access point, radio beacon, femtocell, picocell, or the like. A mobile device may then compute its position fix, such as using obtained measurements or, optionally or alternatively, may report these measurements to a suitable location server, such as, for example, an Enhanced Serving Mobile Location Center (E-SMLC), a Secure User Plane Location (SUPL) Location Platform (SLP), or the like. In turn, with knowledge of locations of measured wireless transmitters, an E-SMLC, SUPL, or like server may, for example, compute a position fix of a mobile device using measured time differences and relative transmission timing, such as via one or more appropriate multilateration techniques, and may communicate the computed position fix to a mobile device of interest.

As was also indicated, at times, one or more operations and/or techniques for enhancing PRS searches via one or more runtime conditions may also be implemented in connection with one or more other positioning approaches, such as those utilizing measurements of time differences of signals received from a number of wireless transmitters, for example. Thus, in some instances, one or more operations and/or techniques discussed herein may be utilized, at least in part, in connection with, for example, AFLT used for locating a mobile device on a CDMA2000 network, as defined by the 3rd Generation Partnership Project 2 (3GPP2). Similarly to OTDOA, AFLT positioning may, for example, make use of information for measured wireless transmitters to help a mobile device to acquire and/or measure applicable reference signals for purposes of computing a position fix based, at least in part, on these measurements. Depending on an implementation, information may include, for example, locations (e.g., coordinates, etc.), transmission characteristics (e.g., timing, power, signal content, signal characteristics, etc.) of measured wireless transmitters, such as referred to as an almanac, a base station almanac (BSA), almanac data or BSA data, etc. Thus, at times, observed time differences measured by a mobile device (e.g., in connection with OTDOA, AFLT, etc.) may, for example, be used, at least in part, in conjunction with a BSA for measured wireless transmitters to calculate a position fix of a mobile device, such as at or by a location server (e.g., an E-SMLC, SLP, etc.), mobile device, or any combination thereof.

Continuing with the above discussion, to facilitate and/or support one or more operations and/or techniques for enhancing PRS searches via one or more runtime conditions, one or more wireless transmitters on a network may broadcast a PRS that may be distinct from one or more PRS broadcasted by other nearby wireless transmitters due, at least in part, to a use of a different frequency, different encoding, different times of transmission, or the like. A mobile device may measure PRS transmitted by a reference wireless transmitter and a nearby wireless transmitter and may obtain, for example, a time of arrival (TOA) and/or a reference signal time difference (RSTD) measurement. In this context, "RSTD" refers to one or more measurements indicative of a difference in time of arrival between a PRS transmitted by a measured wireless transmitter, referred to herein as a "neighbor wireless transmitter," and a PRS transmitted by a reference wireless transmitter. A reference wireless transmitter may be selected by a location server (e.g., an E-SMLC, SLP, etc.), mobile device, or a combination thereof so as to provide good or otherwise sufficient signal strength observed at a receiver of the mobile device, such that a PRS can be more accurately and/or more quickly acquired and/or measured, such as without any special assistance from a serving network, for example.

At times, such as during an LTE Positioning Protocol (LPP) session, for example, a mobile device may be provided with positioning assistance data by a serving network (e.g., by a location server, etc.) to assist in a PRS acquisition and/or measurement, as was also indicated. For example, at times, a location server may provide to a mobile device of interest OTDOA assistance data listing one or more neighbor wireless transmitters capable of transmitting a PRS, which may include identities, center frequencies, etc. of wireless transmitters, their expected RSTD, expected RSTD uncertainty, or the like. Assistance data may also include, for example, an identity of a reference wireless transmitter, frequency for a reference PRS signal, reference PRS code sequence, reference PRS transmission times, or the like. In some instances, assistance data may also specify one or more Quality of Service (QoS) parameters, which may also be used, at least in part, in connection with searching a PRS and/or measuring RSTD. For example, as will be seen, in some instances, a QoS parameter may comprise a response time for measuring TOA and/or providing RSTD measurements to a location server and which a mobile device and/or server may take into account under differing runtime conditions.

A mobile device may then typically measure a PRS (e.g., a TOA for a PRS, etc.) for one or more neighbor wireless transmitters, such as by integrating a received signal at a neighbor wireless transmitter carrier frequency, for example, in accordance with provided assistance data (e.g., a PRS frequency, etc.) and a QoS parameter (e.g., a maximum response time, etc.). For example, based, at least in part, on received assistance data and/or a QoS parameter, a mobile device may be capable of determining a number of neighbor wireless transmitters to be searched (e.g., for acquisition of a PRS, etc.) in an effective and/or efficient manner, an order and/or duration of a particular PRS search, dynamic time frame for responding with RSTD measurements, whether greater accuracy or faster time-to-first fix (TTFF) is desired for an optimum or otherwise suitable position fix, etc., as will be seen.

Currently, a typical approach for searching a PRS, such as via a positioning session using an LPP, as one example, may be less effective and/or efficient due, at least in part, to a relatively static set of 3GPP standards that are rather uniformly applied across a variety of applications and/or systems. For example, in some instances, such as for positioning performed for a location-based service (LBS), it may be more useful to obtain location estimates with a faster time-to-first fix (TTFF) in which accuracy may be less important. In contrast, for other applications, such as for an E911 system discussed below, for example, it may be more useful to obtain location estimates of greater accuracy than what may be needed for a typical LBS (e.g., accuracy may be more important that a TTFF). Thus, in some instances, such as if a variety of different applications and/or systems are involved, for example, a relatively static or uniform PRS search strategy in 3GPP may lead to less than sufficient position fixes, less than accurate TOA and/or RSTD measurements, or the like. To illustrate, using OTDOA as an example, a PRS is typically transmitted via a number of pre-defined LTE positioning subframes grouped via several consecutive subframes or so-called sets. A set of consecutive LTE subframes in which a PRS is transmitted is referred to as a PRS positioning occasion. In an LPP positioning session, a PRS positioning occasion typically comprises between one and six consecutive subframes. Generally, a PRS search capacity of a mobile device comprises a number of wireless transmitters that may be measured at a single PRS occasion, which may depend, at least in part, on runtime conditions, processing resources, memory capacity, etc. of the mobile device. Thus, for a typical mobile device, such as capable of measuring between five and six wireless transmitters per a PRS occasion, for example, there may not be sufficient time to search for PRS, measure RSTD, and/or report these measurements back in accordance with a time-frame specified via a QoS parameter (e.g., OTDOA assistance data includes up to seventy-two neighbor wireless transmitters).

More specifically, if a specified QoS parameter, such as a maximum response time is 3.0 seconds, for example, with a PRS periodicity $T_{PRS}=640$ ms and a number of consecutive subframes $N_{PRS}=1$, a search capacity of a mobile device per a PRS occasion would typically be six wireless transmitters. Then, for a total of $N_{PRS}=6$ and for a periodicity $T_{PRS}=640$ ms, 1280 ms, 1920 ms, and 2560 ms, respectively, a maximum number of neighbor wireless transmitters capable of being measured by a mobile device would be twenty-four (e.g., four times six). Since, according to 3GPP, a mobile device is typically measures PRS and/or provides RSTD measurements in a sorting order of wireless transmitters specified by a location server via OTDOA assistance data, at times, it may not be possible to search for a large number of wireless transmitters, such as prior to running out of a maximum response time. Using the above example, a mobile device may, for example, leave out or miss searching for PRS for forty-eight wireless transmitters on an OTDOA assistance list (e.g., seventy-two minus twenty-four neighbor wireless transmitters). As such, in some instances, such as in a shorter LPP positioning session, for example, a mobile device may be precluded from measuring a number of neighbor wireless transmitters that may have a higher probability of detection, such as those with higher power levels and, thus, presumed to be transmitting a PRS that may be more quickly and/or accurately acquired. In some instances, power levels of neighbor wireless transmitters may, for example, be measured, at least in part, via values of reference signals, such as cell-specific reference signals (CRS) or so-called "reference signal received power" (RSRP) values, as one example. In this context, "RSRP" refers to a linear average over a power contribution of one or more reference signals, such as cell-specific reference signals (CRS), for example, observed at a receiver of a mobile device within a considered measurement frequency bandwidth. RSRP is generally known and need not be described here in greater detail. Of course, details relating to a number of subframes, neighbor wireless transmitters, PRS periodicity, etc. are merely examples, and claimed subject matter is not limited in this regard.

As was also indicated, at times, instead of or in addition to facilitating and/or supporting positioning for an LBS, an OTDOA or like system (e.g., AFLT, etc.) may facilitate and/or support positioning for one or more emergency services, such as E911 emergency services, for example, dispatching an appropriate first responder (e.g., fire, police, ambulance, etc.) to a location of a mobile device in response to a 911 call originating from the mobile device. Generally, E911 emergency services attempt to automatically associate a caller, such as a user of a mobile device, for example, with its location, such as a civic address and/or geographic coordinates. For example, in response to an emergency 911 call to a Public Safety Answering Point (PSAP), the PSAP may initiate operations for determining an estimated location of an emergency caller for dispatch of a public safety service using an OTDOA positioning session via an LPP. Here, similarly to an LPP positioning session for an LBS discussed above, a mobile device may, for example, receive from a location server OTDOA assistance data and/or one or more QoS parameters, among other things, in response to a detection of an emergency event at a PSAP. In response to this message, a mobile device may, for example, initiate an E911 OTDOA positioning session, such as via searching for PRS and/or measuring RSTD, and may transmit measurements to a location server for computation of a position fix. Having computed a position fix, a location server may, for example, route or communicate the position fix to an appropriate PSAP, such as for dispatching a first responder. Again, an E911 positioning session is not intended to be limited to OTDOA or related measurements and, in some instances, may comprise, for example, one or more TOAs of CDMA pilot measurements, such as for positioning via AFLT.

Unfortunately, at times, in measuring neighbor wireless transmitters to satisfy E911 services, similarly to LBS-related positioning discussed above, a number of neighbor wireless transmitters with a higher probability of detection (e.g., with higher RSRP values, etc.) and, thus, more useful for obtaining a more accurate position fix may also be left out or omitted due, at least in part, to a relatively static PRS search strategy, such as defined by 3GPP. For example, here, a mobile device may similarly attempt to search for PRS in decreasing order of priority specified by a location server via OTDOA assistance data, which may prevent detecting and/or measuring a large number of more useful wireless transmitters prior to running out of a maximum response time. As another example, since a PRS sequence may depend, at least in part, on a Physical Cell ID (PCI) used to initialize the sequence, certain frequency arrangements for neighbor wireless transmitters listed via OTDOA assistance data, such as represented via certain mod values may, for example, result in a collision of associated PRS tones, thus, leading to a higher level of PRS interferences and/or cancellations. As such, PRS occasions from certain wireless transmitters may no longer be orthogonal, meaning that some of these wireless transmitters may have a lower probability of detection but nonetheless may be prioritized higher for searching and/or measuring, such as according to a sorting order of priority specified by a location server via OTDOA assistance data.

As yet another example, particular wireless transmitters, such as those denoted by PCI mod 6 typically used to determine which subcarriers within a resource block carry a downlink CRS, for example, may also waste PRS searching and/or RSTD measurement time. For example, according to an LPP in 3GPP, a mobile device typically uses a downlink reference signal for channel estimation and/or demodulation, among other things. If neighbor wireless transmitters have their downlink reference signals on the same subcarriers, for example, it may cause a mobile device to overestimate downlink interference. Also in accordance with 3GPP, a mobile device typically uses reference signals to demodulate applicable modulation symbols carrying data. Thus, if downlink reference signals are interfered, at times, a mobile device may not be capable of correctly demodulating data modulation symbols in reference signals from PCI mod 6 wireless transmitters, for example, resulting in the mobile device continually asking for PRS retransmissions. Again, this may waste PRS searching and/or RSTD measurement time in shorter LPP positioning sessions, may decrease a possibility of detecting and/or measuring a number of more useful wireless transmitters within a maximum response time, may negatively affect a position fix, or the like. Accordingly, it may be desirable to develop one or more methods, systems, and/or apparatuses that may enhance and/or improve a relatively static 3GPP approach for PRS searching, such as in connection with relatively shorter LPP positioning sessions, for example, via runtime conditions accounting for different types of positioning applications, which may include E911 emergency services or other location based services (LBS).

Thus, as will be discussed in greater detail below, in an implementation, a list of neighbor wireless transmitters having corresponding measured CRS power levels, such as represented via RSRP values (e.g., in dBm, etc.), as one possible example, may be communicated to a mobile device by a suitable location server, for example, and/or may be locally maintained, such as in a mobile device's memory or like repository (e.g., a cache, buffer, etc.) in the form of a list or like data structure. Based, at least in part, on such a list, a search for acquisition of PRS may, for example, be prioritized in some manner. For example, at times, a PRS search may be prioritized via searching for PRS from neighbor wireless transmitters associated with higher measured CRS power levels first. In some instances, a search for PRS may, for example, be prioritized by excluding from the search certain wireless transmitters, such as those with a lower probability of detection. At times, a search for acquisition of PRS may also be prioritized based, at least in part, on a horizontal dilution of precision (HDOP), for example. Also, in some instances, a time to search for acquisition of PRS may also be extended or shortened depending, for example, on whether a position fix is requested for satisfying an LBS or E911 services, as will also be seen.

FIG. 1 is a schematic diagram illustrating features associated with an implementation of an example operating environment 100 capable of facilitating or supporting one or more processes or operations for enhancing PRS searches via one or more runtime conditions for use in or with a mobile device, such as a location-aware mobile device 102, for example. It should be appreciated that operating environment 100 is described herein as a non-limiting example that may be implemented, in whole or in part, in the context of various electronic communications networks or combination of such networks, such as public networks (e.g., the Internet, the World Wide Web), private networks (e.g., intranets), WWAN, wireless local area networks (WLAN, etc.), or the like. It should also be noted that claimed subject matter is not limited to indoor implementations. For example, at times, one or more operations or techniques described herein may be performed, at least in part, in an indoor-like environment, which may include partially or substantially enclosed areas, such as urban canyons, town squares, amphitheaters, parking garages, rooftop gardens, patios, or the like. At times, one or more operations or techniques described herein may be performed, at least in part, in an outdoor environment.

As illustrated, in an implementation, mobile device 102 may, for example, receive or acquire satellite positioning system (SPS) signals 104 from SPS satellites 106. In some instances, SPS satellites 106 may be from a single global navigation satellite system (GNSS), such as the GPS or Galileo satellite systems, for example. In other instances, SPS satellites 106 may be from multiple GNSS such as, but not limited to, GPS, Galileo, Glonass, or Beidou (Compass) satellite systems. In certain implementations, SPS satellites 106 may be from any one several regional navigation satellite systems (RNSS) such as, for example, WAAS, EGNOS, QZSS, just to name a few examples.

At times, mobile device 102 may, for example, transmit wireless signals to, or receive wireless signals from, a suitable wireless communication network. In one example, mobile device 102 may communicate with a cellular communication network, such as by transmitting wireless signals to, or receiving wireless signals from, one or more wireless transmitters capable of transmitting and/or receiving wireless signals, such as a base station transceiver 108 over a wireless communication link 110, for example. Similarly, mobile device 102 may transmit wireless signals to, or receive wireless signals from a local transceiver 112 over a wireless communication link 114. Base station transceiver 108, local transceiver 112, etc. may be of the same or similar type, for example, or may represent different types of devices, such as access points, radio beacons, cellular base stations, femtocells, or the like, depending on an implementation. Similarly, local transceiver 112 may comprise, for example, a wireless transmitter and/or receiver capable of transmitting and/or receiving wireless signals. For example, as will be seen, at times, wireless transceiver 112 may be capable of obtaining one or more observations from one or more other terrestrial transmitters.

In a particular implementation, local transceiver 112 may be capable of communicating with mobile device 102 at a shorter range over wireless communication link 114 than at a range established via base station transceiver 108 over wireless communication link 110. For example, local transceiver 112 may be positioned in an indoor or like environment and may provide access to a wireless local area network (WLAN, e.g., IEEE Std. 802.11 network, etc.) or wireless personal area network (WPAN, e.g., Bluetooth® network, etc.). In another example implementation, local transceiver 112 may comprise a femtocell or picocell capable of facilitating communication via link 114 according to an applicable cellular or like wireless communication protocol. Of course, it should be understood that these are merely examples of networks that may communicate with mobile device 102 over a wireless link, and claimed subject matter is not limited in this respect. For example, in some instances, operating environment 100 may include a larger number of base station transceivers 108, local transceivers 112, etc.

In an implementation, base station transceiver 108, local transceiver 112, etc. may communicate with servers 116, 118, or 120 over a network 122 via one or more links 124.

Network 122 may comprise, for example, any combination of wired or wireless communication links. In a particular implementation, network 122 may comprise, for example, Internet Protocol (IP)-type infrastructure capable of facilitating or supporting communication between mobile device 102 and one or more servers 116, 118, 120, etc. via local transceiver 112, base station transceiver 108, etc. In another implementation, network 122 may comprise, for example cellular communication network infrastructure, such as a base station controller or master switching center to facilitate and/or support mobile cellular communication with mobile device 102. As was indicated, in some instances, network 122 may facilitate and/or support communications with a PSAP (not shown) or like entity, such as for purposes of initiating and/or implementing an E911 OTDOA positioning session, for example. Servers 116, 118, and/or 120 may comprise any suitable servers or combination thereof capable of facilitating or supporting one or more operations or techniques discussed herein. For example, servers 116, 118, and/or 120 may comprise one or more location servers (e.g., Evolved Serving Mobile Location Server (E-SMLC), Secure User Plane Location Server/SUPL Location Platform (SUPL SLP), etc.), positioning assistance servers, navigation servers, map servers, crowdsourcing servers, network-related servers, or the like.

In particular implementations, and as also discussed below, mobile device 102 may have circuitry or processing resources capable of determining a position fix or estimated location of mobile device 102, initial (e.g., a priori) or otherwise. For example, if satellite signals 104 are available, mobile device 102 may compute a position fix based, at least in part, on pseudorange measurements to four or more SPS satellites 106. Here, mobile device 102 may compute such pseudorange measurements based, at least in part, on pseudonoise code phase detections in signals 104 acquired from four or more SPS satellites 106. In particular implementations, mobile device 102 may receive from one or more servers 116, 118, or 120 positioning assistance data to aid in the acquisition of signals 104 transmitted by SPS satellites 106 including, for example, almanac, ephemeris data, Doppler search windows, just to name a few examples.

In some implementations, mobile device 102 may obtain a position fix by processing wireless signals received from one or more terrestrial transmitters positioned at known locations (e.g., base station transceiver 108, local transceiver 112, etc.) using any one of several techniques, such as, for example, OTDOA, AFLT, or the like. In these techniques, a range from mobile device 102 may, for example, be measured to three or more of terrestrial transmitters based, at least in part, on one or more reference signals (e.g., PRS, CRS, etc.) transmitted by these transmitters and received at mobile device 102, as was indicated. Here, servers 116, 118, or 120 may be capable of providing positioning assistance data to mobile device 102 including, for example, OTDOA reference transmitter data, OTDOA neighbor transmitter data, PRC and/or CRS configuration data, RSTD search window, QoS parameters, locations, identities, orientations, etc. of terrestrial transmitters to facilitate and/or support one or more applicable positioning techniques (e.g., AFLT, OTDOA, etc.). At times, servers 116, 118, or 120 may include, for example, a base station almanac (BSA) indicating locations, identities, orientations, etc. of cellular base stations (e.g., base station transceiver 108, local transceiver 112, etc.) in one or more particular areas or regions associated with operating environment 100.

As alluded to previously, in particular environments, such as indoor or like environments (e.g., urban canyons, etc.), mobile device 102 may not be capable of acquiring or processing signals 104 from a sufficient number of SPS satellites 106 so as to perform a suitable positioning technique. Thus, optionally or alternatively, mobile device 102 may be capable of determining a position fix based, at least in part, on signals acquired from one or more local transmitters, such as femtocells, Wi-Fi access points, or the like. For example, mobile device 102 may obtain a position fix by measuring ranges to three or more local transceivers 112 positioned at known locations. In some implementations, mobile device 102 may, for example, measure ranges by obtaining a MAC address from local transceiver 112, as was indicated.

In an implementation, mobile device 102 may, for example, receive positioning assistance data (e.g., OTDOA, AFLT assistance data, etc.) for one or more positioning operations from servers 116, 118, and/or 120. At times, positioning assistance data may include, for example, locations, identities, orientations, etc. of one or more local transceivers 112, base station transceivers 108, etc. positioned at known locations for measuring ranges to these transmitters based, at least in part, on an RTT, TOA, TDOA, etc., or any combination thereof. In some instances, positioning assistance data to aid indoor positioning operations may include, for example, radio heat maps, context parameter maps, routeability graphs, etc., just to name a few examples. Other assistance data received by mobile device 102 may include, for example, electronic digital maps of indoor or like areas for display or to aid in navigation. A map may be provided to mobile device 102 as it enters a particular area, for example, and may show applicable features such as doors, hallways, entry ways, walls, etc., points of interest, such as bathrooms, pay phones, room names, stores, or the like. By obtaining a digital map of an indoor or like area of interest, mobile device 102 may, for example, be capable of overlaying its current location over the displayed map of the area so as to provide an associated user with additional context, frame of reference, or the like. The terms "positioning assistance data" and "navigation assistance data" may be used interchangeably herein.

According to an implementation, mobile device 102 may access navigation assistance data via servers 116, 118, and/or 120 by, for example, requesting such data through selection of a universal resource locator (URL). In particular implementations, servers 116, 118, and/or 120 may be capable of providing navigation assistance data to cover many different areas including, for example, floors of buildings, wings of hospitals, terminals at an airport, portions of a university campus, areas of a large shopping mall, etc., just to name a few examples. Also, if memory or data transmission resources at mobile device 102 make receipt of positioning assistance data for all areas served by servers 116, 118, and/or 120 impractical or infeasible, a request for such data from mobile device 102 may, for example, indicate a rough or course estimate of a location of mobile device 102. Mobile device 102 may then be provided navigation assistance data covering, for example, one or more areas including or proximate to a roughly estimated location of mobile device 102. In some instances, one or more servers 116, 118, and/or 120 may facilitate and/or support searching for and/or measuring PRS from one or more applicable wireless transmitters (e.g., local transceiver 112, base station transceiver 108, etc.) and/or performing RSTD or like measurements, such as for determining a position fix in connection with an E911 OTDOA positioning session, for example, and may provide the position fix to an applicable PSAP via network 122.

Even though a certain number of computing platforms and/or devices are illustrated herein, any number of suitable computing platforms and/or devices may be implemented to facilitate and/or support one or more techniques or processes associated with operating environment 100. For example, at times, network 122 may be coupled to one or more wired or wireless communication networks (e.g., WLAN, etc.) so as to enhance a coverage area for communications with mobile device 102, one or more base station transceivers 108, local transceiver 112, servers 116, 118, 120, or the like. In some instances, network 122 may facilitate and/or support femtocell-based operative regions of coverage, for example. Again, these are merely example implementations, and claimed subject matter is not limited in this regard.

Figure 2:
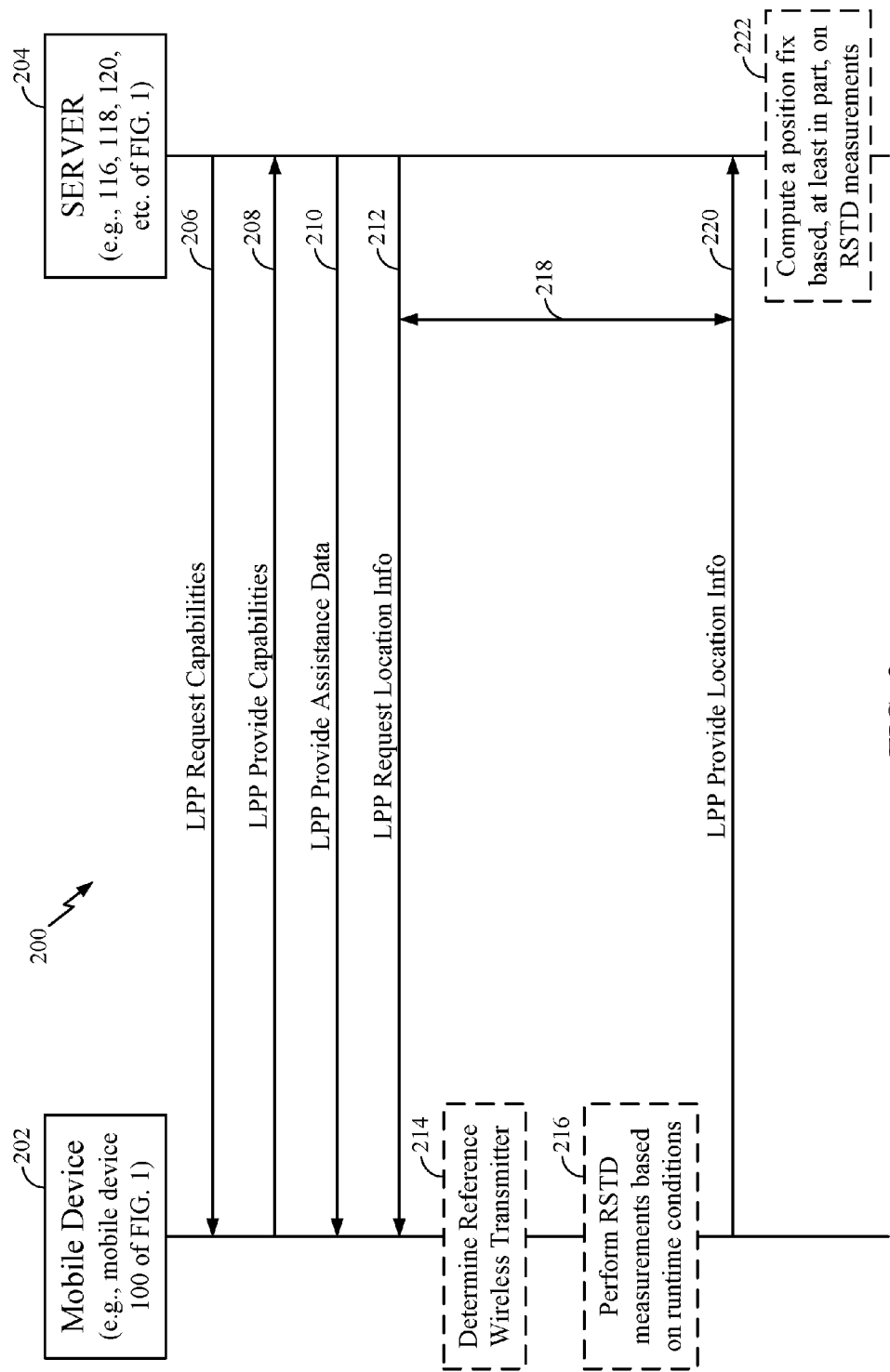
FIG. 2 is a message flow diagram illustrating an implementation of an example message exchange process for enhancing PRS searches via one or more runtime conditions.

Referring now to FIG. 2, which is a message flow diagram illustrating an implementation of an example message exchange process 200 between a mobile device 202 and a server 204 that may facilitate and/or support one or more operations and/or techniques for enhancing PRS searches via one or more runtime conditions. As was indicated, even though process 200 illustrates OTDOA positioning using an LPP, claimed subject matter is not limited in this regard, and any other suitable positioning technique and/or protocol may be used herein, in whole or in part. For example, in some instances, an LPPe, LPP/LPPe, RRC protocol (e.g., as defined in 3GPP TS 36.331, etc.), IS-801 protocol (e.g., as defined in 3GPP2 TS C.S0022, etc.), or the like may also be employed herein, in whole or in part. At times, one or more operations and/or techniques for enhancing PRS searches via one or more runtime conditions may, for example, be implemented via OTDOA positioning for UMTS access, Enhanced Observed Time Difference (E-OTD) for GSM or AFLT, or the like. In addition, a downlink signal that is measured by mobile device 202 may not be a PRS, such as currently defined in 3GPP, but some other downlink reference signal or pilot signal (e.g., a common reference signal (CRS) for LTE, etc.). Also, measurements of a downlink signal may not be of RSTD, such as also defined by 3GPP, for example, but instead of some other suitable quantity and/or phenomena, such as TOA, angle of arrival (AOA), received signal strength (e.g., RSSI), return trip time (RTT), signal-to-noise (S/N) ratio, or the like. Thus, although one or more applicable positioning techniques, protocols, measured quantities, etc. may differ, a search strategy with respect to acquisition of one are more downlink reference signals and/or pilot signals, such as via one or more runtime conditions, as discussed below, for example, may be the same as or similar to that described for process 200.

Process 200 may, for example, be implemented, at least in part, within operating environment 100 of FIG. 1. Thus, in some instances, mobile device 202 may comprise or be representative of mobile device 100 of FIG. 1, for example, and server 204 may comprise or be representative of server 116, 118, and/or 120 of FIG. 1, for example. In some instances, mobile device 202 may comprise, for example, a SUPL Enabled Terminal (SET), and server 204 may comprise, for example, a SUPL Location Platform (SLP), such as an H-SLP or D-SLP, just to illustrate one possible implementation. It should be noted that information acquired and/or produced, such as input signals, output signals, operations, results, messages, etc. associated with process 200 may be represented via one or more digital signals. It should also be appreciated that even though one or more operations are illustrated or described concurrently or with respect to a certain sequence, other sequences or concurrent operations may be employed. In addition, although the description below references particular aspects or features illustrated in certain other figures, one or more operations may be performed with other aspects or features.

As illustrated, positioning of mobile device 202 may be facilitated and/or supported via an exchange of LPP messages between mobile device 202 and server 204 via any suitable communications network, such as network 122 of FIG. 1, for example, via one or more wireless transmitters, such as base station transceiver 108, local transceiver 112 of FIG. 1, etc., or a combination thereof. As will be seen, in some instances, process 200 may be used, at least in part, to obtain a relatively faster TTFF of mobile device 202, such as if a position fix is requested for satisfying an LBS, for example, which may be used, at least in part, for purposes of traveling, navigation, direction finding, social media applications, or like services. At times, process 200 may be used, at least in part, to obtain a location estimate of greater accuracy than what may be needed for a typical LBS, such as for routing of the location estimate to a PSAP to satisfy E911 services in connection with an emergency call from mobile device 202, for example. Again, it should be noted that process 200 is not limited to indoor implementations. For example, at times, process 200 may be performed, at least in part, in an indoor-like environment, which may include partially or substantially enclosed areas, such as urban canyons, town squares, amphitheaters, parking garages, rooftop gardens, patios, or the like. In some instances, process 200 may, for example, be performed, at least in part, in an outdoor environment.

Thus, as illustrated, server 204 may, for example, transmit an LPP Request Capabilities message 206 to mobile device 202, such as indicating what types of capabilities are needed and/or supported by server 204 for an LPP positioning session. In turn, mobile device 202 may, for example, transmit an LPP Provide Capabilities message 208 providing its positioning capabilities to server 204, such as by specifying modes, frequency bands, etc. that are supported by mobile device 202. Server 204 may then transmit an LPP Provide Assistance Data message 210 to mobile device 202, such as comprising, for example, OTDOA assistance data for performing and/or returning RSTD measurements to server 204. As discussed above, OTDOA assistance data may indicate that a particular wireless transmitter is to be used by mobile device 202 as a reference wireless transmitter, may provide applicable PRS parameters, or the like. In some instances, LPP Provide Assistance Data message 210 may also include, for example, measured CRS power levels for neighbor wireless transmitters, such as represented via a list or like data structure with corresponding RSRP values (e.g., in dBm, etc.), as was also indicated. Optionally or alternatively, RSRP values may, for example, be transmitted by server 204 in one or more other messages, LPP-related or otherwise, and/or may be downloaded and/or stored locally on mobile device 204, as discussed below.

Server 204 may then send an LPP Request Location Information message 212 to mobile device 202 to request RSTD measurements for a reference wireless transmitter and up to seventy-two neighbor wireless transmitters, for example. LPP Request Location Information message 212 may also comprise, for example, a desired accuracy of an OTDOA location estimate, expected multipath and/or non-line-of-sight (NLOS) conditions, and/or an optional periodic reporting period. In some instances, LPP Request Location Information message 212 may include, for example, a QoS parameter, such as indicating a timeframe for responding with RSTD measurements. As illustrated at 214, mobile device 202 may, for example, determine and/or make use of any indicated reference wireless transmitter. Mobile device 202 may, for example, base its determination, at least in part, on a signal level and/or signal quality (e.g. a S/N ratio, etc.) of one or more wireless transmitters indicated as being suitable (or not unsuitable) as a reference wireless transmitter. For example, at times, mobile device 202 may, for example, determine to use a wireless transmitter with a higher signal strength and/or higher S/N ratio, just to illustrate one possible implementation. Claimed subject matter is not so limited, of course. For example, in at least one implementation, mobile device 202 may employ a reference wireless transmitter specifically designated as such by server 204.

As illustrated at 216, having determined a reference wireless transmitter, mobile device 202 may, for example, utilize, in whole or in part, obtained assistance data to perform one or more RSTD measurements, such as based, at least in part, on one or more runtime conditions. For example, depending on an implementation, mobile device 202 may utilize, at least in part, OTDOA assistance data, RSRP values, and/or a QoS parameter, such as a maximum response time for performing and/or replying with RSTD measurements to server 204, referenced generally at 218. A maximum response time may, for example, be specified via an integer number of seconds, as one example, such as measured between receipt of message 212 and an LPP Provide Location information message 220. Here, one or more RSTD measurements may, for example, be performed by first measuring a TOA for a PRS acquired from a reference wireless transmitter and a TOA for a PRS acquired from a neighbor wireless transmitter and then determining an RSTD measurement from a difference in these two TOA measurements.

In these one or more implementations, a TOA for a PRS acquired from one or more neighbor wireless transmitters may, for example, be measured via prioritizing a search for acquisition of such a PRS in some manner. For example, at times, acquisition of PRS may be prioritized via runtime conditions that may depend, at least in part, on whether a position fix is requested for satisfying a typical LBS (e.g., a condition indicating that a faster TTFF may be preferred, etc.) or for satisfying emergency E911 services (e.g., a condition indicating that greater accuracy may be preferred, etc.). An indication of whether a position fix is requested for satisfying an LBS or E911 services may, for example, be communicated to mobile device 202 by server 204 via one or more appropriate messages, such as in connection with a Serving Call Session Control Function (S-CSCF), an Emergency Call Session Control Function (E-CSCF), a Routing Determination Function (RDF), or the like. These or like techniques are generally known and need not be described here in greater detail. At times, mobile device 202 may also determine an emergency condition on its own, such as without a help from server 204 and/or associated wireless communications network, for example, such as if a 911 call is placed by a user using mobile device 202.

Thus, in some instances, such as if a position fix is requested for satisfying an LBS, for example, mobile device 202 may prioritize a search for acquisition of PRS that may be more quickly acquired, such as to facilitate and/or support a faster TTFF, as was indicated. For example, instead of measuring TOA for PRS in a sorting order of neighbor wireless transmitters provided by server 204, mobile device 202 may measure TOA for PRS from stronger neighbor wireless transmitters first, such as those associated with higher measured power levels or RSRP values. At times, power levels of signals from neighbor wireless transmitters may be measured in advance and then assembled into a suitable data structure, such as a list, for example, which may be provided to and/or obtained by mobile device 202, as discussed below. Thus, in at least one implementation, mobile device 202 may access and/or utilize, at least in part, a list with measured power levels of neighbor wireless transmitters (e.g., RSRP, etc.), for example, and may prioritize a search for PRS based, at least in part, on a descending order of these measured power levels.

As was indicated, measured power levels of CRS may comprise and/or be represented via any suitable data structure, such as a list of neighbor wireless transmitters with associated RSRP values (e.g., in dBm, etc.), as one possible example. Such a list may, for example, be communicated to mobile device 202 by server 204 via one or more appropriate messages. For example, in some instances, such a list may be communicated via LPP Provide Assistance Data message 210, such as part of OTDOA assistance data. At times, such a list may, for example, be communicated via LPP Request Location Information message 212, such as part of a request for RSTD measurements. Claimed subject matter is not so limited, of course. For example, in some instances, a list with RSRP values may be obtained independently of OTDOA assistance data and/or may be locally maintained, such as in a memory or like repository (e.g., a cache, buffer, etc.) of mobile device 202. Such a list may, for example, be communicated, downloaded, stored, etc. (e.g., as digital signals and/or states, etc.) via any suitable push and/or pull technology, such as prior to or upon user's entering an area of interest, upon request, user input, or the like, with or without help from server 204 and/or associated wireless communications network.

Thus, according to an implementation, by measuring TOA for PRS from neighbor wireless transmitters with higher RSRP values first, rather than in a sorting order specified by sever 204, if applicable, a larger number of neighbor wireless transmitters more useful for obtaining a faster TTFF, for example, may be detected and/or measured, such as prior to expiration of maximum response time 218. As such, at times, by determining which neighbor wireless transmitters to measure first (e.g., based on RSRP values, etc.), a time to acquire PRS may be shortened. Thus, in some instances, mobile device 202 may determine a threshold (e.g., minimum, etc.) number of requisite neighbor wireless transmitters sufficient for a faster TTFF and may provide corresponding RSTD measurements to server 204, again, prior to expiration of maximum response time 218. At times, mobile device 202 may also provide RSTD measurements to server 204, such as prior to expiration of maximum response time 218, for example, by determining that a threshold number of TOA and/or RSTD measurements required for a faster TTFF is of sufficient quality. Here, any suitable quality indicator, such as, for example, a S/N ratio, standard deviation, RSRP, etc. may be used, in whole or in part, or otherwise considered. Mobile device 202 may, thus, be capable of implementing enhanced (e.g., more effective, more efficient, etc.) PRS searches, such as by determining how many neighbor wireless transmitters to measure for a faster TTFF, which particular PRS may be more quickly acquired, or the like. In some instances, however, such as if all or most neighbor wireless transmitters on a list with RSRP values have been detected and/or measured and if maximum response time 218 has not yet expired, for example, mobile device 202 may continue to search for PRS from remaining neighbor wireless transmitters, such as those indicated via OTDOA assistance data.

According to an implementation, mobile device 202 may further prioritize a PRS search by excluding from the search certain wireless transmitters, such as those that may be less useful for a faster TTFF, for example, despite these transmitters being indicated for performing RSTD measurements via OTDOA assistance data, an RSRP list, or the like. For example, at times, mobile device 202 may exclude PCI mod 6 wireless transmitters due, at least in part, to their lower probability of PRS acquisition and/or detection, as discussed above. Here, mobile device 202 may, for example, identify PCI mod 6 wireless transmitters by referencing physical cell IDs communicated by server 204 as part of OTDOA assistance data, such as via message 210, just to illustrate one possible implementation.

In some instances, a search for acquisition of PRS may be further prioritized based, at least in part, on a horizontal dilution of precision (HDOP). For example, at times, certain neighbor wireless transmitters may be selected for acquisition of a PRS so as to reduce an HDOP in computation of a requested position fix. In this context, "HDOP" refers to a measure of precision with respect to a horizontal position fix affected by geometry of neighbor wireless transmitters. At times, an HDOP may, for example be computed based, at least in part, on initial (e.g., rough, etc.) or so-called "a priori" locations of applicable neighbor wireless transmitters, such as indicated via OTDOA assistance data, RSRP list, etc. A priori locations of neighbor wireless transmitters may, for example, be estimated, at least in part, via one or more suitable positioning techniques, such as Cell ID, enhanced Cell ID, dear reckoning, etc., just to name a few examples. Here, using geometry of a priori locations of wireless transmitters, a number of neighbor wireless transmitters may, for example, be selected for acquisition of a PRS so as to avoid or reduce an HDOP solution error. For example, at times, it may be useful to select neighbor wireless transmitters that are spread out more evenly, relatively uniformly, not located on one side of a mobile device, etc.

In addition, at times, a search for acquisition of PRS may, for example, be prioritized based, at least in part, on one or more expected RSTD and/or expected RSTD uncertainty values, such as provided in connection with OTDOA assistance data via message 210. For example, here, based, at least in part, on one or more expected RSTD and/or expected RSTD uncertainty values, a search window for neighbor wireless transmitters may be determined and subsequently narrowed so as to increase a possibility of acquiring PRS from transmitters more useful for a faster TTFF. In some instances, a search window may also be narrowed, for example, so as to increase a possibility of acquisition of a larger number of PRS within maximum response time 218. Here, any appropriate techniques may be used, in whole or in part.

As was indicated, at times, RSTD measurements may be performed, at least in part, to obtain location estimates of greater accuracy than what may be needed for a typical LBS. For example, according to at least one implementation, RSTD measurements at 216 may be performed, at least in part, to obtain an estimated location of mobile device 202 to satisfy E911 services, as also discussed above. Thus, in some instances, while searching for acquisition of a PRS and/or performing RSTD measurements, accuracy of a position fix of mobile device 202 may be prioritized higher than a TTFF, for example, such as if there is an indication (e.g., via message 210, 212, etc., E-CSCF, etc.) that a position fix is requested for satisfying E911 or like emergency services. Here, to obtain a more accurate position fix, a particular PRS may, for example, be searched for a duration that may be longer than a duration of a PRS search performed for an LBS. Here, a search for a particular PRS may, for example, be extended up to maximum response time 218. In some instances, a particular PRS may also be acquired multiple instances, such as to improve accuracy in measurement of an associated TOA, for example. A duration of a search for a PRS may also be extended if it is determined, for example, that quality of an applicable RSTD measurement is lower than some threshold, which may be determined, at least in part, experimentally and may be pre-defined or configured, for example, or otherwise dynamically defined in some manner depending on a wireless environment, mobile device, application, or the like.

According to an implementation, here, neighbor wireless transmitters associated with higher RSRP values may be searched first, such as similarly to an LBS-related approach discussed above, for example, since wireless transmitters with higher RSRP values may also be presumed to be transmitting PRS that may be more accurately acquired. In some instances, mobile device 202 may prioritize a PRS search by excluding certain wireless transmitters, such as those denoted by PCI mod 6, for example, due, at least in part, to their lower possibility of detection, as was also indicated. Likewise, here, mobile device 202 may identify PCI mod 6 wireless transmitters by referencing physical cell IDs communicated by server 204 as part of OTDOA assistance data, such as via message 210, for example.

Thus, to satisfy an LBS and/or E911 services, mobile device 202 may perform RSTD measurements for a suitable number of neighbor wireless transmitters, such as by respectively computing a difference between a TOA measurement for a reference wireless transmitter and a TOA measurement for a neighbor wireless transmitter, as discussed above. Mobile device 202 may perform RSTD measurements any suitable number of times, such as until mobile device 202 measures all applicable neighbor wireless transmitters, for example, and/or until mobile device 202 attains maximum response time 218. Depending on an implementation, mobile device 202 may then transmit LPP Provide Location Information message 220 to server 204, such as prior to or at expiration of maximum response time 218, for example, conveying RSTD measurements performed at 216. LPP Provide Location Information message 220 may also include a time (or times) at which one or more RSTD measurements were obtained, for example, and an identity of a reference wireless transmitter for RSTD measurements (e.g. a reference Cell ID, carrier frequency, etc.). Message 220 may also include, for example, identities of measured neighbor wireless transmitters (e.g. a PCI, Global Cell ID, cell carrier frequency, etc.), quality of applicable measurements (e.g. an expected error in an RSTD measurement, etc.), etc.

As illustrated at 222, in an implementation, server 204 may, for example, compute a position fix of mobile device 202 based, at least in part, on transmitted RSTD measurements, such as via one or more appropriate positioning techniques (e.g., OTDOA, AFLT, etc.). In some instances, a position fix of mobile device 202 may, for example, be computed at or by mobile device 202, such as if assistance data provided via message 210 includes BSA for a reference and neighbor wireless transmitters (e.g., location coordinates, synchronization data, etc.). In such a case, mobile device 202 may, for example, provide its computed location estimate to server 204 via message 220.

Figure 3:
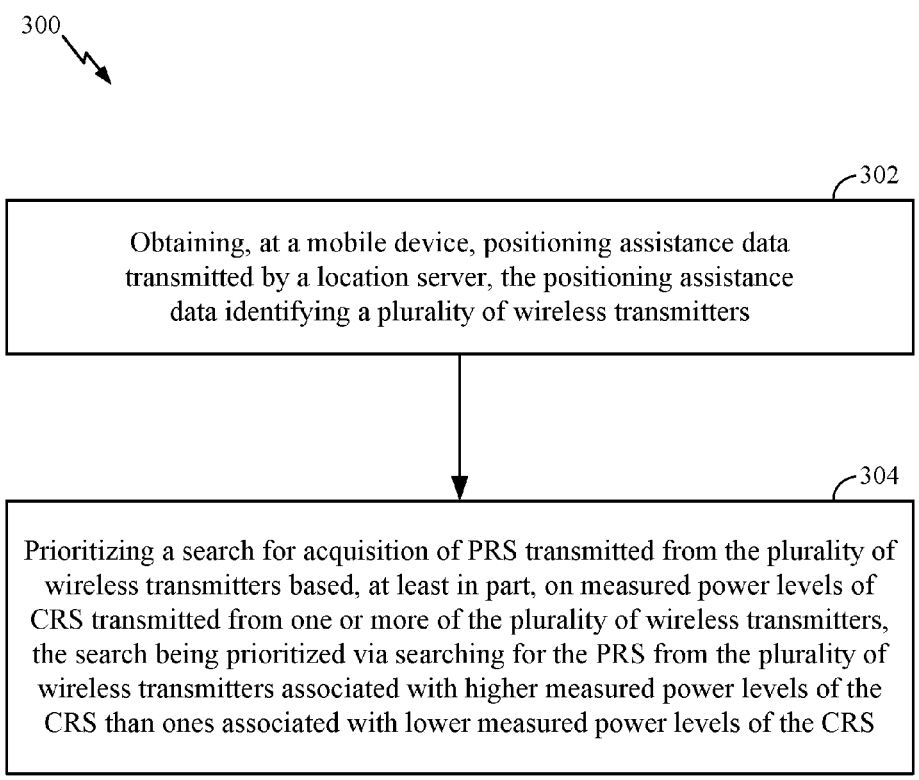
FIG. 3 is a flow diagram illustrating an implementation of an example process for enhancing PRS searches via one or more runtime conditions.

With this in mind, attention is now drawn to FIG. 3, which is a flow diagram illustrating an implementation of an example process 300 that may be performed, in whole or in part, to facilitate and/or support one or more operations and/or techniques for enhancing PRS searches via one or more runtime conditions for use in or with a location-aware mobile device, such as mobile device 102 of FIG. 1 and/or mobile device 202 of FIG. 2, for example. It should be noted that information acquired or produced, such as, for example, input signals, output signals, operations, results, etc. associated with example process 300 may be represented via one or more digital signals. It should also be appreciated that even though one or more operations are illustrated or described concurrently or with respect to a certain sequence, other sequences or concurrent operations may be employed. In addition, although the description below references particular aspects or features illustrated in certain other figures, one or more operations may be performed with other aspects or features.

Example process 300 may, for example, begin at operation 302 with obtaining, at a mobile device, positioning assistance data, such as transmitted by a location server, as one possible example, the positioning assistance data identifying a plurality of wireless transmitters. As was indicated, positioning assistance data may, for example, be transmitted by a suitable server (e.g., server 204 of FIG. 2, etc.) via one or more appropriate messages (e.g., message 210 of FIG. 2, etc.) using one or more appropriate protocols (e.g., an LPP, etc.). Positioning assistance data may comprise one or more parameters to facilitate and/or support OTDOA, AFLT, or like positioning, for example, and may identify a reference wireless transmitter (e.g., via a PCI, PRS/CRS sequence, PRS configuration, etc.), neighbor wireless transmitter (e.g., via Cell ID, expected RSTD, expected RSTD uncertainty, etc.), or the like. In some instances, positioning assistance data may comprise, for example, measured CRS power levels for a plurality of neighbor wireless transmitters, such as represented via a list of associated RSRP values (e.g., in dBm, etc.), just to illustrate one possible implementation. At times, a list with RSRP values may, for example, be communicated and/or obtained independently (e.g., downloaded upon request, user input, etc.) of positioning assistance data and/or may be locally maintained, such as in a memory or like repository (e.g., a cache, buffer, etc.) of a mobile device.

With regard to operation 304, a search for acquisition of PRS transmitted from the plurality of wireless transmitters may, for example, be prioritized based, at least in part, on measured power levels of CRS transmitted from one or more of the plurality of wireless transmitters. For example, in some instances, the search may be prioritized via searching for the PRS from the plurality of wireless transmitters associated with higher measured power levels of the CRS than ones associated with lower measured power levels of the CRS. As a way of illustration and as was also discussed, instead of measuring TOA for PRS in a sorting order of neighbor wireless transmitters specified by a suitable server, a mobile device may, for example, measure TOA for PRS from stronger neighbor wireless transmitters first, such as those associated with higher measured power levels represented via RSRP, as one possible example. Thus, by measuring TOA for PRS from neighbor wireless transmitters with higher RSRP values first, rather than in a specified sorting order, a larger number of neighbor wireless transmitters more useful for obtaining a position fix may, for example, be detected, such as within a timeframe specified via a QoS parameter. At times, a mobile device may also shorten a time to acquire a PRS from one or more neighbor wireless transmitters, such as, for example, by determining that a certain number of TOA and/or RSTD measurements is of sufficient quality, as was also discussed.

In at least one implementation, a mobile device may prioritize a PRS search by excluding from the search one or more wireless transmitters that may be less useful for positioning due, at least in part, to their lower probability of PRS acquisition and/or detection, such as PCI mod 6 wireless transmitters, for example. As was indicated, a mobile device may reference physical cell IDs listed in positioning assistance data to identify these transmitters. In some instances, a search for acquisition of PRS may be prioritized based, at least in part, on an HDOP, for example, so as by selecting neighbor wireless transmitters so as to reduce the HDOP in computation of a position fix of a mobile device. In addition, at times, a search for acquisition of PRS may, for example, be prioritized by narrowing a search window for neighbor wireless transmitters based, at least in part, on one or more expected RSTD and/or expected RSTD uncertainty values. In some instances, these or like approaches may, for example, increase a probability of acquisition of a larger number of PRS within a shorter positioning session, such as specified via a QoS parameter, as one possible example. Having acquired appropriate PRS, a mobile device may, for example, perform one or more applicable measurements (e.g., RSTD measurements, etc.) and may convey these measurements to a server via a suitable message (e.g., message 220 of FIG. 2, etc.), such as for computation of a position fix, as was also discussed.

Figure 4:
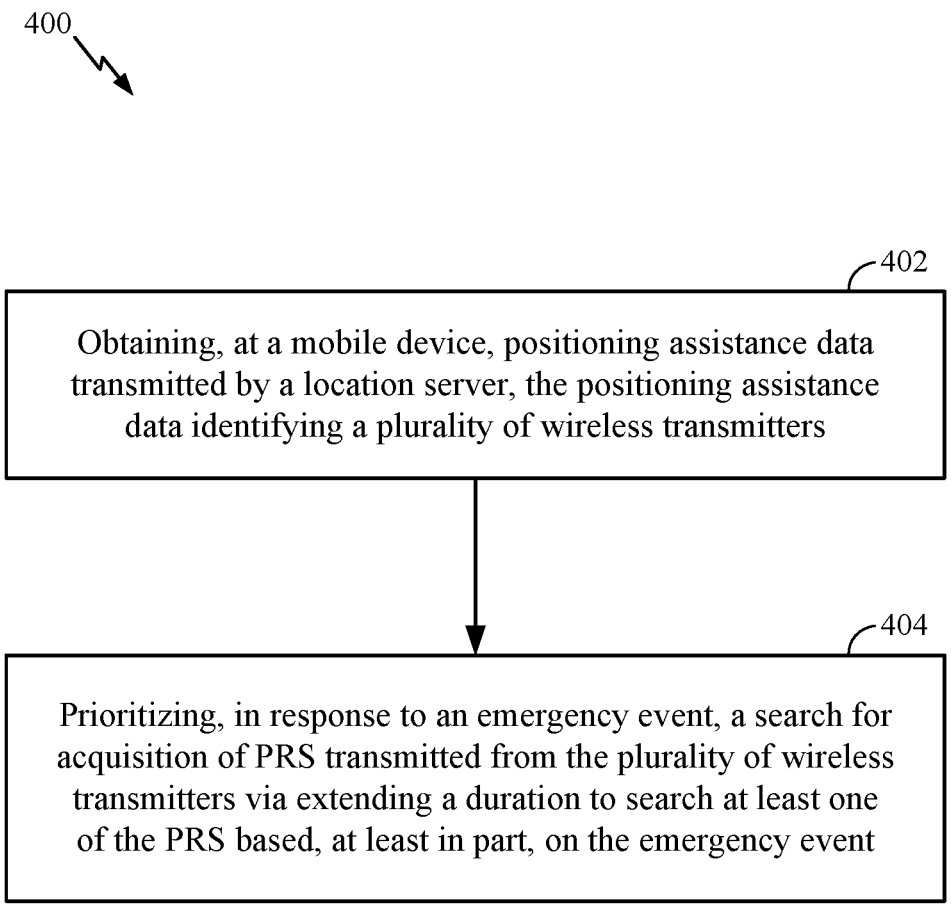
FIG. 4 is a flow diagram illustrating another implementation of an example process for enhancing PRS searches via one or more runtime conditions.

FIG. 4 is a flow diagram illustrating an implementation of another example process, referenced herein at 400, that may be performed, in whole or in part, to facilitate and/or support one or more operations and/or techniques for enhancing PRS searches via one or more runtime conditions for use in or with a location-aware mobile device, such as mobile device 102 of FIG. 1 and/or mobile device 202 of FIG. 2, for example. Likewise, it should be noted that information acquired or produced, such as, for example, input signals, output signals, operations, results, etc. associated with example process 400 may be represented via one or more digital signals. It should also be appreciated that even though one or more operations are illustrated or described concurrently or with respect to a certain sequence, other sequences or concurrent operations may be employed. In addition, although the description below references particular aspects or features illustrated in certain other figures, one or more operations may be performed with other aspects or features.

Example process 400 may, for example, begin at operation 402 with obtaining, at a mobile device, positioning assistance data, such as transmitted by a location server, as one possible example, the positioning assistance data identifying a plurality of wireless transmitters. Likewise, here, positioning assistance data may be transmitted via one or more appropriate messages (e.g., message 210 of FIG. 2, etc.) using one or more appropriate protocols (e.g., an LPP, etc.) and may comprise, for example, OTDOA, AFLT, or like assistance data (e.g., a list with RSRP values, etc.), such as similarly to operation 302 of FIG. 3. In some instances, at least part of positioning assistance data (e.g., a list with RSRP values, etc.) may, for example, be communicated to and/or obtained independently by a mobile device (e.g., downloaded upon request, user input, etc.) and/or may be locally maintained, such as in its memory or like repository (e.g., a cache, buffer, etc.).

At operation 404, a search for acquisition of PRS transmitted from the plurality of wireless transmitters may, for example, be prioritized in response to an emergency event, such as via extending a duration to search at least one of the PRS based, at least in part, on such an emergency event. As previously discussed, an emergency event may comprise, for example, a 911 call originating from a mobile device. Here, by extending a duration of a search for a PRS, a mobile device may, for example, prioritize accuracy of a position fix higher than a TTFF. As discussed above, in some instances, a search for a PRS may, for example, be extended up to a timeframe specified via a QoS parameter, such as a maximum response time. At times, a duration of a search for a PRS may, for example, be extended if quality of one or more RSTD measurements is lower than some threshold. In addition, to improve accuracy in measurement of an associated TOA, a particular PRS may, for example, be acquired multiple instances, which may also extent a duration of a search.

In an implementation, a search for acquisition of PRS may be prioritized by searching neighbor wireless transmitters associated with higher RSRP values first, such as discussed above in connection with operation 304 of FIG. 3, for example. In some instances, a mobile device may prioritize a PRS search by excluding certain wireless transmitters, such as those denoted by PCI mod 6, for example, due, at least in part, to a lower possibility of PRS acquisition and/or detection, as was also indicated. Similarly, here, having acquired PRS, a mobile device may perform one or more applicable measurements (e.g., RSTD measurements, etc.) and may convey the measurements to a server via a suitable message (e.g., message 220 of FIG. 2, etc.), such as for computation of a position fix. An obtained position fix may, for example, be subsequently routed to a PSAP, such as to satisfy E911 services' request in connection with an emergency call from a mobile device.

Figure 5:
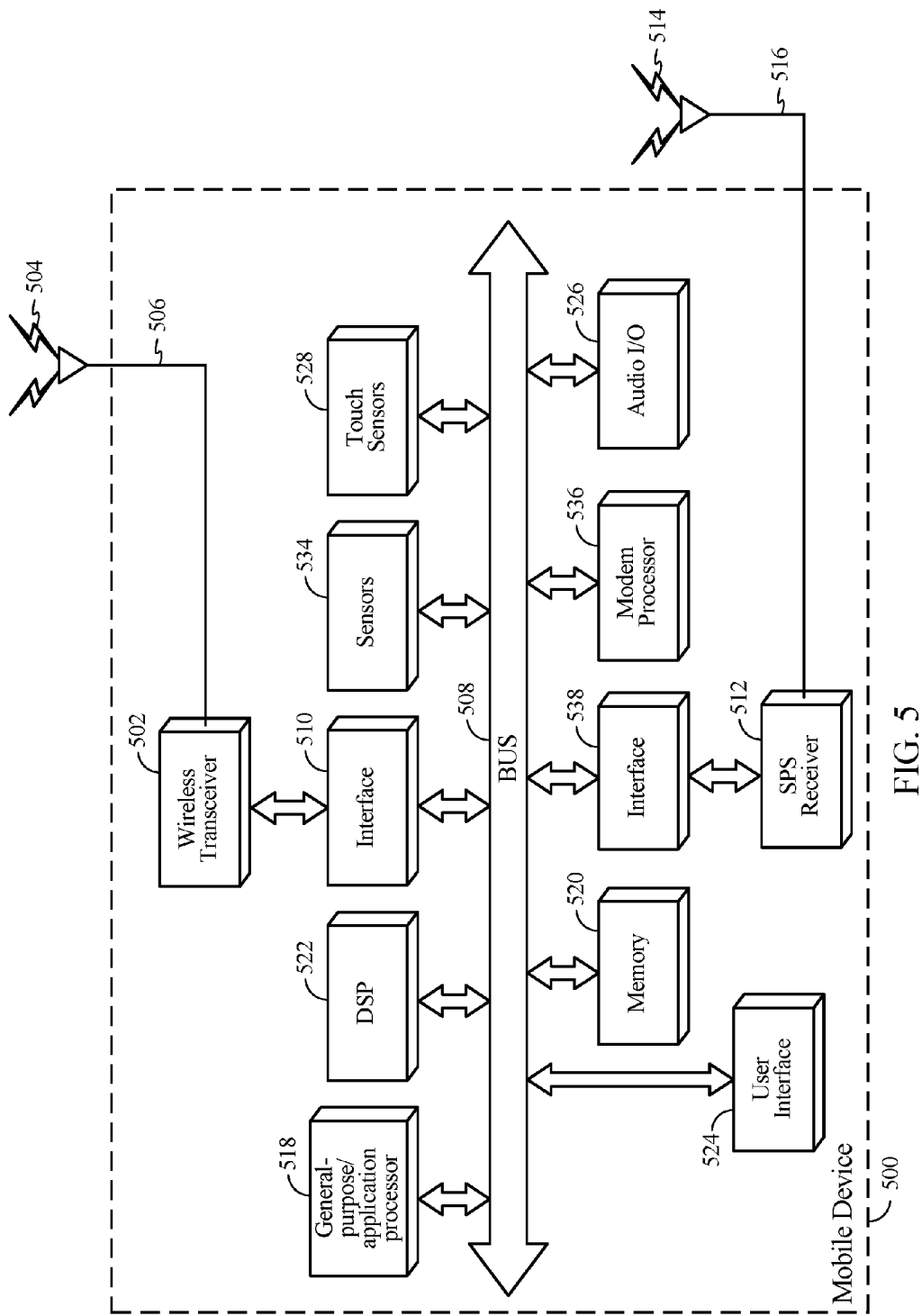
FIG. 5 is a schematic diagram illustrating an implementation of an example computing environment associated with a mobile device.

FIG. 5 is a schematic diagram of an implementation of an example computing environment associated with a mobile device that may be used, at least in part, to facilitate and/or support one or more operations and/or techniques for enhancing PRS searches via one or more runtime conditions. An example computing environment may comprise, for example, a mobile device 500 that may include one or more features or aspects of mobile device 102 of FIG. 1 and/or mobile device 202 of FIG. 2, though claimed subject matter is not so limited. For example, in some instances, mobile device 500 may comprise a wireless transceiver 502 capable of transmitting and/or receiving wireless signals, referenced generally at 504, such as via an antenna 506 over a suitable wireless communications network. Wireless transceiver 502 may, for example, be capable of sending or receiving one or more suitable communications, such as one or more communications discussed with reference to FIGS. 1-4. Wireless transceiver 502 may, for example, be coupled or connected to a bus 508 via a wireless transceiver bus interface 510. Depending on an implementation, at times, wireless transceiver bus interface 510 may, for example, be at least partially integrated with wireless transceiver 502. Some implementations may include multiple wireless transceivers 502 or antennas 506 so as to enable transmitting or receiving signals according to a corresponding multiple wireless communication standards such as WLAN or WiFi, Code Division Multiple Access (CDMA), Wideband-CDMA (W-CDMA), Long Term Evolution (LTE), Bluetooth®, just to name a few examples.

In an implementation, mobile device 500 may, for example, comprise an SPS or like receiver 512 capable of receiving or acquiring one or more SPS or other suitable wireless signals 514, such as via an SPS or like antenna 516. SPS receiver 512 may process, in whole or in part, one or more acquired SPS signals 514 for estimating a location of mobile device 500, initial or otherwise. In some instances, one or more general-purpose/application processors 518 (henceforth referred to as "processor"), memory 520, digital signal processor(s) (DSP) 522, or like specialized devices or processors not shown may be utilized to process acquired SPS signals 514, in whole or in part, calculate a location of mobile device 500, such as in conjunction with SPS receiver 512, or the like. Storage of SPS or other signals for implementing one or more positioning operations, such as in connection with one or more techniques for enhancing PRS searches via one or more runtime conditions, for example, may be performed, at least in part, in memory 520, suitable registers or buffers (not shown). Although not shown, it should be appreciated that in at least one implementation one or more processors 518, memory 520, DSPs 522, or like specialized devices or processors may comprise one or more processing modules capable of obtaining positioning assistance data transmitted by a location server, the positioning assistance data identifying a plurality of wireless transmitters; prioritizing a search for acquisition of PRS transmitted from the plurality of wireless transmitters based, at least in part, on measured power levels of CRS transmitted from one or more of the plurality of wireless transmitters, the search being prioritized via searching for the PRS from the plurality of wireless transmitters associated with higher measured power levels of the CRS than ones associated with lower measured power levels of the CRS.

It should be noted that all or part of one or more processing modules may be implemented using or otherwise including hardware, firmware, software, or any combination thereof. Processing modules may be representative of one or more circuits capable of performing at least a portion of information computing technique or process. By way of example but not limitation, processor 518 or DSP 522 may include one or more processors, controllers, microprocessors, microcontrollers, application specific integrated circuits, digital signal processors, programmable logic devices, field programmable gate arrays, central processing units, graphics processor units, or the like, or any combination thereof. Thus, at times, processor 518 or DSP 522 or any combination thereof may comprise or be representative of means for obtaining positioning assistance data transmitted by a location server, the positioning assistance data identifying a plurality of wireless transmitters, such as to implement operation 302 of FIG. 3, at least in part. In addition, in at least one implementation, processor 518 or DSP 522 may be representative of or comprise, for example, means for prioritizing a search for acquisition of positioning reference signals (PRS) transmitted from the plurality of wireless transmitters based, at least in part, on measured power levels of cell-specific reference signals (CRS) transmitted from one or more of the plurality of wireless transmitters, such as to implement operation 304 of FIG. 3, at least in part. Also, at times, the means for prioritizing the search may further comprise means for prioritizing the search via searching for the PRS from the plurality of wireless transmitters associated with higher measured power levels of the CRS than ones associated with lower measured power levels of the CRS, such as to implement operation 304 of FIG. 3, at least in part.

In at least one implementation, processor 518 or DSP 522 or any combination thereof may comprise or be representative of means for obtaining positioning assistance data transmitted by a location server, the positioning assistance data identifying a plurality of wireless transmitters, such as to implement operation 402 of FIG. 4, at least in part. In addition, in some instances, processor 518 or DSP 522 may be representative of or comprise, for example, means for prioritizing, in response to an emergency event, a search for acquisition of PRS transmitted from the plurality of wireless transmitters via extending a duration to search at least one of the PRS based, at least in part, on the emergency event, such as to implement operation 404 of FIG. 4, at least in part.

As illustrated, DSP 522 may be coupled or connected to processor 518 and memory 520 via bus 508. Although not shown, in some instances, bus 508 may comprise one or more bus interfaces that may be integrated with one or more applicable components of mobile device 500, such as DSP 522, processor 518, memory 520, or the like. In various embodiments, one or more operations or functions described herein may be performed in response to execution of one or more machine-readable instructions stored in memory 520, such as on a computer-readable storage medium, such as RAM, ROM, FLASH, disc drive, etc., just to name a few examples. Instructions may, for example, be executable via processor 518, one or more specialized processors not shown, DSP 522, or the like. Memory 520 may comprise a non-transitory processor-readable memory, computer-readable memory, etc. that may store software code (e.g., programming code, instructions, etc.) that may be executable by processor 518, DSP 522, or the like to perform operations or functions described herein.

Mobile device 500 may comprise a user interface 524, which may include any one of several devices such as, for example, a speaker, microphone, display device, vibration device, keyboard, touch screen, etc., just to name a few examples. In at least one implementation, user interface 524 may enable a user to interact with one or more applications hosted on mobile device 500. For example, one or more devices of user interface 524 may store analog or digital signals on memory 520 to be further processed by DSP 522, processor 518, etc. in response to input or action from a user. Similarly, one or more applications hosted on mobile device 500 may store analog or digital signals in memory 520 to present an output signal to a user. In some implementations, mobile device 500 may optionally include a dedicated audio input/output (I/O) device 526 comprising, for example, a dedicated speaker, microphone, digital to analog circuitry, analog to digital circuitry, amplifiers, gain control, or the like. It should be understood, however, that this is merely an example of how audio I/O device 526 may be implemented, and that claimed subject matter is not limited in this respect. As seen, mobile device 500 may comprise one or more touch sensors 528 responsive to touching or like pressure applied on a keyboard, touch screen, or the like.

Mobile device 500 may comprise one or more sensors 534 coupled or connected to bus 508, such as, for example, one or more inertial sensors, ambient environment sensors, or the like. Inertial sensors of sensors 544 may comprise, for example, one or more accelerometers (e.g., collectively responding to acceleration of mobile device 500 in one, two, or three dimensions, etc.), gyroscopes or magnetometers (e.g., to support one or more compass or like applications, etc.), etc., just to illustrate a few examples. Ambient environment sensors of mobile device 500 may comprise, for example, one or more barometric pressure sensors, temperature sensors, ambient light detectors, camera sensors, microphones, etc., just to name few examples. Sensors 534 may generate analog or digital signals that may be stored in memory 520 and may be processed by DSP 522, processor 518, etc., such as in support of one or more applications directed to positioning or navigation operations, wireless communications, radio heat map learning, video gaming or the like.

In a particular implementation, mobile device 500 may comprise, for example, a modem processor 536, dedicated or otherwise, capable of performing baseband processing of signals received or downconverted via wireless transceiver 502, SPS receiver 512, or the like. Similarly, modem processor 536 may perform baseband processing of signals to be upconverted for transmission via wireless transceiver 502, for example. In alternative implementations, instead of having a dedicated modem processor, baseband processing may be performed, at least in part, by processor 518, DSP 522, or the like. In addition, in some instances, an interface 538, although illustrated as a separate component, may be integrated, in whole or in part, with one or more applicable components of mobile device 500, such as bus 508 or SPS receiver 512, for example. Optionally or alternatively, SPS receiver 512 may be coupled or connected to bus 508 directly. It should be understood, however, that these are merely examples of components or structures that may perform baseband processing, and that claimed subject matter is not limited in this regard.

Figure 6:
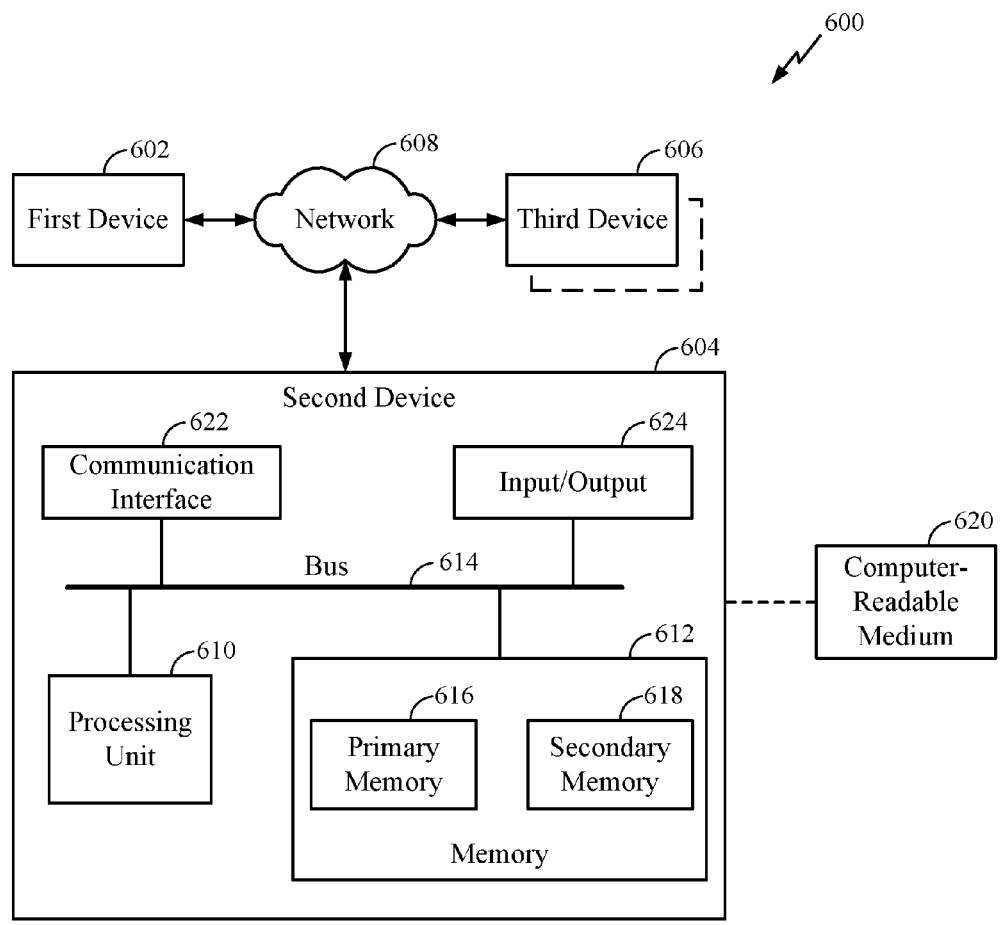
FIG. 6 is a schematic diagram illustrating an implementation of an example computing environment associated with a server.

FIG. 6 is a schematic diagram illustrating an implementation of an example computing environment or system 600 that may be associated with and/or include one or more servers and/or other devices capable of partially and/or substantially implementing and/or supporting one or more operations and/or techniques for enhancing PRS searches via one or more runtime conditions, such as discussed above in connection with FIGS. 1-5, for example. Computing environment 600 may include, for example, a first device 602, a second device 604, a third device 606, etc., which may be operatively coupled together via a communications network 608. In some instances, first device 602 may comprise a location server capable of providing positioning assistance parameters, such as, for example, identities, locations, etc. of known wireless transmitters, radio heat map, base station almanac, electronic digital map, database of wireless transmitters, bias estimates, signal measurements, reference transmitter parameters, neighbor transmitter parameters, or the like, such as discussed herein. For example, first device 602 may also comprise a server capable of providing an electronic digital map to a mobile device based, at least in part, on a priori or rough estimate of a location of the mobile device (e.g., determined via last known SPS position fix, dead reckoning using one or more appropriate sensors, Cell ID, enhanced Cell ID, etc.), upon request, or the like. First device 602 may also comprise a server capable of providing any other suitable positioning assistance parameters (e.g., a radio heat map, etc.) relevant to a location of a mobile device. Second device 604 or third device 606 may comprise, for example, mobile devices, though claimed subject matter is not so limited. For example, in some instances, second device 604 may comprise a server functionally or structurally similar to first device 602, just to illustrate another possible implementation. In addition, communications network 608 may comprise, for example, one or more wireless transmitters, such as cellular base stations, Wi-Fi access points, femtocells, or the like. Of course, claimed subject matter is not limited in scope in these respects.

First device 602, second device 604, or third device 606 may be representative of any device, appliance, platform, or machine that may be capable of exchanging parameters and/or information over communications network 608. By way of example but not limitation, any of first device 602, second device 604, or third device 606 may include: one or more computing devices or platforms, such as, for example, a desktop computer, a laptop computer, a workstation, a server device, or the like; one or more personal computing or communication devices or appliances, such as, for example, a personal digital assistant, mobile communication device, or the like; a computing system or associated service provider capability, such as, for example, a database or information storage service provider/system, a network service provider/system, an Internet or intranet service provider/system, a portal or search engine service provider/system, a wireless communication service provider/system; or any combination thereof. Any of first, second, or third devices 602, 604, and 606, respectively, may comprise one or more of a mobile device, wireless transmitter or receiver, server, etc. in accordance with example implementations described herein.

In an implementation, communications network 608 may be representative of one or more communication links, processes, or resources capable of supporting an exchange of information between at least two of first device 602, second device 604, or third device 606. By way of example but not limitation, communications network 608 may include wireless or wired communication links, telephone or telecommunications systems, information buses or channels, optical fibers, terrestrial or space vehicle resources, local area networks, wide area networks, intranets, the Internet, routers or switches, and the like, or any combination thereof. As illustrated, for example, via a dashed lined box partially obscured by third device 606, there may be additional like devices operatively coupled to communications network 608. It is also recognized that all or part of various devices or networks shown in computing environment 600, or processes or methods, as described herein, may be implemented using or otherwise including hardware, firmware, software, or any combination thereof.

By way of example but not limitation, second device 604 may include at least one processing unit 610 that may be operatively coupled to a memory 612 via a bus 614. Processing unit 610 may be representative of one or more circuits capable of performing at least a portion of a suitable computing procedure or process. For example, processing unit 610 may include one or more processors, controllers, microprocessors, microcontrollers, application specific integrated circuits, digital signal processors, programmable logic devices, field programmable gate arrays, or the like, or any combination thereof. Although not shown, second device 604 may include a location-tracking unit that may initiate a position fix of a suitable mobile device, such as in an area of interest, for example, based, at least in part, on one or more received or acquired wireless signals, such as from an SPS, one or more cellular base stations, Wi-Fi access points, etc. In some implementations, a location-tracking unit may be at least partially integrated with a suitable processing unit, such as processing unit 610, for example, though claimed subject matter is not so limited. In certain server-based or server-supported implementations, processing unit 610 may, for example, comprise means for obtaining positioning assistance data transmitted by a location server, the positioning assistance data identifying a plurality of wireless transmitters, such as to facilitate and/or support operations 302 and/or 304 of FIG. 3, at least in part.

In some instances, processing unit 610 may, for example, comprise means for prioritizing a search for acquisition of positioning reference signals (PRS) transmitted from the plurality of wireless transmitters based, at least in part, on measured power levels of cell-specific reference signals (CRS) transmitted from one or more of the plurality of wireless transmitters, such as to facilitate and/or support operations 302 and/or 304 of FIG. 3, at least in part. Depending on an implementation, the means for prioritizing the search may further comprise means for prioritizing the search via searching for the PRS from the plurality of wireless transmitters associated with higher measured power levels of the CRS than ones associated with lower measured power levels of the CRS, such as to facilitate and/or support operations 302 and/or 304 of FIG. 3, at least in part.

At times, processing unit 610 may, for example, comprise means for obtaining positioning assistance data transmitted by a location server, the positioning assistance data identifying a plurality of wireless transmitters, such as to facilitate and/or support operations 402 and/or 404 of FIG. 4, at least in part. In some instances, processing unit 610 may also comprise, for example, means for prioritizing, in response to an emergency event, a search for acquisition of PRS transmitted from the plurality of wireless transmitters via extending a duration to search at least one of the PRS based, at least in part, on the emergency event, such as to facilitate and/or support operations 402 and/or 404 of FIG. 4, at least in part.

Memory 612 may be representative of any information storage mechanism or appliance. Memory 612 may include, for example, a primary memory 616 and a secondary memory 618. Primary memory 616 may include, for example, a random access memory, read only memory, etc. While illustrated in this example as being separate from processing unit 610, it should be understood that all or part of primary memory 616 may be provided within or otherwise co-located/coupled with processing unit 610. Secondary memory 618 may include, for example, same or similar type of memory as primary memory or one or more information storage devices or systems, such as, for example, a disk drive, an optical disc drive, a tape drive, a solid state memory drive, etc. In certain implementations, secondary memory 618 may be operatively receptive of, or otherwise configurable to couple to, a computer-readable medium 620. Computer-readable medium 620 may include, for example, any non-transitory storage medium that may carry or make accessible information, code, or instructions for one or more of devices in computing environment 600. Computer-readable medium 620 may also be referred to as a machine-readable medium, storage medium, or the like.

Second device 604 may include, for example, a communication interface 622 that may provide for or otherwise support an operative coupling of second device 604 to at least communications network 608. By way of example but not limitation, communication interface 622 may include a network interface device or card, a modem, a router, a switch, a transceiver, and the like. Second device 604 may also include, for example, an input/output device 624. Input/output device 624 may be representative of one or more devices or features that may be configurable to accept or otherwise introduce human or machine inputs, or one or more devices or features that may be capable of delivering or otherwise providing for human or machine outputs. By way of example but not limitation, input/output device 624 may include an operatively configured display, speaker, keyboard, mouse, trackball, touch screen, information port, or the like.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units de-signed to perform the functions described herein, or combinations thereof.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, measurements, messages, parameters, frames, packets, content and/or the like. It should be understood, however, that all of these and/or similar terms are to be associated with appropriate physical quantities or manifestations, and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/ or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. Likewise, operation of a memory device to store bits, values, elements, symbols, characters, terms, numbers, numerals, measurements, messages, parameters, frames, packets, content and/or the like may comprise a physical transformation. With particular types of memory devices, such a physical transformation may comprise a physical transformation of an article to a different state or thing. For example, but without limitation, for some types of memory devices, a change in state may involve an accumulation and/or storage of charge or a re-lease of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") net-work, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more examples; however, again, particular context of description and/or usage provides helpful guidance regarding inferences to be drawn.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. Signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method comprising:
   obtaining, at a mobile device, positioning assistance data identifying a plurality of wireless transmitters;
   prioritizing a search for acquisition of positioning reference signals (PRS) transmitted from the plurality of wireless transmitters based, at least in part, on measured power levels of cell-specific reference signals (CRS) transmitted from one or more of the plurality of wireless transmitters,
   the search being prioritized via searching for the PRS from the plurality of wireless transmitters associated with higher measured power levels of the CRS than ones associated with lower measured power levels of the CRS,
   wherein the prioritizing the search for the acquisition of the PRS further comprises:
      determining whether a position fix for the mobile device is requested for satisfying and emergency service or a location-based service (LBS); and
      extending or shortening a time to search for the acquisition of the PRS based, at least in part, on the determination.

2. The method of claim 1, wherein the measured power levels are stored in a list accessible by the mobile device.

3. The method of claim 2, wherein the list comprises the positioning assistance data or is obtained independently of the positioning assistance data.

4. The method of claim 1, wherein the measured power levels comprise reference signal received power (RSRP) levels.

5. The method of claim 1, wherein the positioning assistance data is transmitted according to: a Long Term Evolution (LTE) positioning protocol (LPP); an LPP extensions (LPPe) protocol; or a Secure User Plane Location (SUPL) user plane location protocol (ULP).

6. The method of claim 1, wherein the positioning assistance data comprises observed time difference of arrival (OTDOA) assistance data or Advanced Forward Link Trilateration (AFLT) assistance data.

7. The method of claim 1, wherein the PRS comprises at least one of the following: PRS in Long Term Evolution (LTE); 1× signals for in Code Division Multiple Access (CDMA); satellite positioning system (SPS) signals; wireless wide area network (WWAN) signals; a downlink reference signal; a pilot signal, or any combination thereof.

8. The method of claim 1, wherein the positioning assistance data is transmitted via a location server comprising an Enhanced Serving Mobile Location Center (E-SMLC) or a Secure User Plane Location (SUPL) Location Platform (SLP) or emergency SLP (eSLP).

9. The method of claim 1, wherein the plurality of wireless transmitters comprises: one or more neighbor cellular base stations; one or more neighbor wireless local area network (WLAN) access points; one or more neighbor radio beacons; one or more neighbor femtocells; or one or more neighbor picocells, or any combination thereof.

10. The method of claim 1, and further comprising prioritizing the search for acquisition of the PRS based, at least in part, on a horizontal dilution of precision (HDOP) computed based, at least in part, on locations of at least some of the plurality of wireless transmitters.

11. The method of claim 10, wherein the search for acquisition of the PRS is prioritized so as to reduce the HDOP in computation of a position fix of the mobile device.

12. The method of claim 1, and further comprising prioritizing the search for acquisition of the PRS by excluding from the search one or more wireless transmitters denoted by Physical Cell ID (PCI) mod 6.

13. The method of claim 1, wherein the time to search for the acquisition of the PRS is being extended or shortened within a timeframe specified by a quality of service (QoS) parameter transmitted by a location server as part of the positioning assistance data.

14. The method of claim 13, wherein the QoS parameter comprises a maximum response time for responding to the location server with measurements of at least some of the plurality of wireless transmitters associated with the higher measured power levels.

15. The method of claim 14, wherein the measurements comprise reference signal time difference (RSTD) measurements.

16. The method of claim 1, wherein the prioritizing the search for the acquisition of the PRS is based, at least in part, on at least one of the following: one or more expected RSTD values obtained via the positioning assistance data; one or more expected RSTD uncertainty values obtained via the positioning assistance data, or any combination thereof.

17. The method of claim 16, wherein the search is prioritized via:

determining a search window for the identified plurality of wireless transmitters based, at least in part on the one or more expected RSTD values and/or one or more expected RSTD uncertainty values; and narrowing the search window for at least some of the plurality of wireless transmitters based, at least in part, on the determination.

18. The method of claim 17, wherein the search window is narrowed so as to increase a probability of the acquisition of the PRS within a timeframe specified by a location server via a QoS parameter.

19. The method of claim 1, wherein the search is prioritized so as to increase accuracy of a position fix or shorten a time-to-first fix (TTFF) of the mobile device.

20. The method of claim 1, wherein the search for the acquisition of the PRS is being prioritized based, at least in part, on a descending order of the higher measured power levels of the plurality of wireless transmitters.

21. An apparatus comprising:
means for obtaining positioning assistance data identifying a plurality of wireless transmitters;
means for prioritizing a search for acquisition of positioning reference signals (PRS) transmitted from the plurality of wireless transmitters based, at least in part, on measured power levels of cell-specific reference signals (CRS) transmitted from one or more of the plurality of wireless transmitters,
the means for prioritizing the search further comprising means for prioritizing the search via searching for the PRS from the plurality of wireless transmitters associated with higher measured power levels of the CRS than ones associated with lower measured power levels of the CRS,
wherein the means for prioritizing the search for the acquisition of the PRS further comprises:
means for determining whether a position fix for a mobile device is requested for satisfying an emergency service or a location-based service (LBS); and
means for extending or shortening a time to search for the acquisition of the PRS based, at least in part, on the determination.

22. The apparatus of claim 21, wherein the means for prioritizing the search further comprise: means for prioritizing the search based, at least in part, on a descending order of the higher measured power levels of the plurality of wireless transmitters; means for prioritizing the search based, at least in part, on a horizontal dilution of precision (HDOP) computed based, at least in part, on locations of at least some of the plurality of wireless transmitters; means for prioritizing the search based, at least in part, on excluding from the search one or more wireless transmitters denoted by Physical Cell ID (PCI) mod 6; means for prioritizing the search based, at least in part, on one or more expected RSTD values obtained via the positioning assistance data; or means for prioritizing the search based, at least in part, on one or more expected RSTD uncertainty values obtained via the positioning assistance data, or any combination thereof.

23. An apparatus comprising:
a communication interface to communicate with an electronic communications network, the communication interface configured to:
obtain positioning assistance data identifying a plurality of wireless transmitters; and
one or more processors coupled to a memory and to the communication interface, the one or more processors configured to:

prioritize a search for acquisition of positioning reference signals (PRS) transmitted from the plurality of wireless transmitters based, at least in part, on measured power levels of cell-specific reference signals (CRS) transmitted from one or more of the plurality of wireless transmitters, the search being prioritized via searching for the PRS from the plurality of wireless transmitters associated with higher measured power levels of the CRS than ones associated with lower measured power levels of the CRS, wherein the one or more processors configured to prioritize the search further configured to:
  determine whether a position fix for a mobile device is requested for satisfying an emergency service or a location-based service (LBS); and
  extend or shorten a time to search for the acquisition of the PRS based, at least in part, on the determination.

24. The apparatus of claim 23, wherein the one or more processors further configured to prioritize the search for acquisition of the PRS based, at least in part, on a horizontal dilution of precision (HDOP) computed based, at least in part, on locations of at least some of the plurality of wireless transmitters.

25. The apparatus of claim 23, wherein the one or more processors further configured to prioritize the search for acquisition of the PRS by excluding from the search one or more wireless transmitters denoted by Physical Cell ID (PCI) mod 6.

26. The apparatus of claim 23, wherein the one or more processors further configured to prioritize the search for the acquisition of the PRS based, at least in part, on at least one of the following: one or more expected RSTD values obtained via the positioning assistance data; one or more expected RSTD uncertainty values obtained via the positioning assistance data, or any combination thereof.

27. The apparatus of claim 23, wherein the one or more processors further configured to prioritize the search to increase accuracy of a position fix or shorten a time-to-first fix (TTFF) of the mobile device.

28. A non-transitory storage medium having instructions executable by a processor to:
  obtain, at a mobile device, positioning assistance data identifying a plurality of wireless transmitters;
  prioritize a search for acquisition of positioning reference signals (PRS) transmitted from the plurality of wireless transmitters based, at least in part, on measured power levels of cell-specific reference signals (CRS) transmitted from one or more of the plurality of wireless transmitters, the search being prioritized via searching for the PRS from the plurality of wireless transmitters associated with higher measured power levels of the CRS than ones associated with lower measured power levels of the CRS, wherein the instructions to prioritize the search further comprise instructions to:
    determine whether a position fix for the mobile device is requested for satisfying an emergency service or a location-based service (LBS); and
    extend or shorten a time to search for the acquisition of the PRS based, at least in part, on the determination.

* * * * *